United States Patent
Arnold et al.

(10) Patent No.: US 10,489,669 B2
(45) Date of Patent: Nov. 26, 2019

(54) SENSOR UTILISING OVERLAPPING SIGNALS AND METHOD THEREOF

(71) Applicant: Soundisplay Limited, London (GB)

(72) Inventors: Bertrand Arnold, London (GB); Helen Marianne Benarrosh, London (GB); Sergio Garcia Castillo, Oxford (GB); Brett Greenwood, Surrey (GB)

( * ) Notice: Subject to any disclaimer, the term of this patent is extended or adjusted under 35 U.S.C. 154(b) by 0 days.

(21) Appl. No.: 15/526,619

(22) PCT Filed: Nov. 16, 2015

(86) PCT No.: PCT/GB2015/053469
§ 371 (c)(1),
(2) Date: May 12, 2017

(87) PCT Pub. No.: WO2016/075494
PCT Pub. Date: May 19, 2016

(65) Prior Publication Data
US 2018/0285673 A1    Oct. 4, 2018

(30) Foreign Application Priority Data

Nov. 14, 2014  (EP) .................................. 14193285

(51) Int. Cl.
*G06K 9/20*  (2006.01)
*G01V 8/20*  (2006.01)
(Continued)

(52) U.S. Cl.
CPC ............. *G06K 9/2027* (2013.01); *G01V 8/20* (2013.01); *G06K 9/2036* (2013.01); *G06T 7/13* (2017.01);
(Continued)

(58) Field of Classification Search
CPC . G06T 7/74; G06T 7/248; G06T 2207/10028; G06T 2200/04; G06T 15/005; G06T 15/80; G06T 7/13; G06T 7/246; G01V 8/20; G06K 2209/21; G06K 9/0004; G06K 9/00087; G06K 9/00604; G06K 9/2027; G06K 9/2036; G06K 9/62
See application file for complete search history.

(56) References Cited

U.S. PATENT DOCUMENTS 4,868,901 A   9/1989  Kniskern et al.
6,603,867 B1  8/2003  Sugino et al.
(Continued)

OTHER PUBLICATIONS

Athina Nickitas-Etienne, International Preliminary Report on Patentability in PCT/GB2015/053469, dated May 26, 2017.

*Primary Examiner* — Jingge Wu
(74) *Attorney, Agent, or Firm* — Woods Oviatt Gilman LLP; Katherine H. McGuire, Esq.

(57) ABSTRACT

A device for detecting the location of an object within two or more at least partially overlapping sensing volumes of the device. The device is configured to illuminate the sensing volumes and generate a sensing signal individually for each sensing volume by sensing light modulated by any object in the sensing volume. Spatial encoding is applied to the sensing volumes. The device comprises a processor configured to determine the presence of an object in the sensing volumes based on the sensing signals generated for the sensing volumes and on the spatial encoding.

17 Claims, 11 Drawing Sheets

(51) Int. Cl.
*G06T 7/62* (2017.01)
*G06T 7/73* (2017.01)
*G06T 7/13* (2017.01)
*G06T 7/246* (2017.01)

(52) U.S. Cl.
CPC ............... *G06T 7/248* (2017.01); *G06T 7/62* (2017.01); *G06T 7/74* (2017.01); *G06T 2207/10152* (2013.01)

(56) References Cited

U.S. PATENT DOCUMENTS

| | | | |
|---|---|---|---|
| 8,405,637 B2* | 3/2013 | Bridger | G06F 3/0421 250/216 |
| 2006/0228018 A1 | 10/2006 | Abramovich et al. | |
| 2008/0186488 A1* | 8/2008 | Kiesel | G01N 21/39 356/335 |
| 2008/0186492 A1* | 8/2008 | Kiesel | G01N 21/39 356/433 |
| 2009/0190121 A1* | 7/2009 | Hegyi | G01N 15/12 356/28 |
| 2009/0194705 A1* | 8/2009 | Kiesel | G01N 21/645 250/458.1 |
| 2010/0201988 A1* | 8/2010 | Kiesel | G01N 21/05 356/419 |
| 2011/0135164 A1 | 6/2011 | Maurer et al. | |
| 2011/0222062 A1* | 9/2011 | Martini | G01N 21/05 356/417 |
| 2013/0329018 A1 | 12/2013 | Gordon et al. | |
| 2015/0234049 A1* | 8/2015 | Weber-Grabau | G01S 17/026 356/72 |
| 2015/0323787 A1* | 11/2015 | Yuste | G02B 27/0075 348/79 |

* cited by examiner

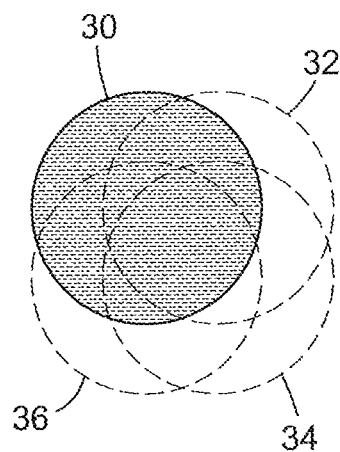
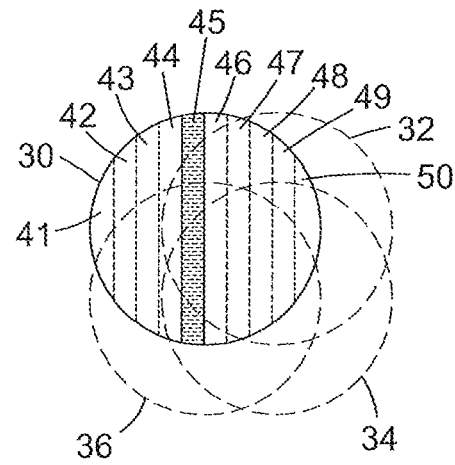
Fig. 7a Fig. 7b
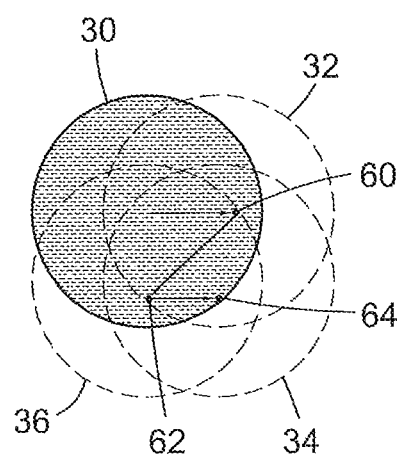
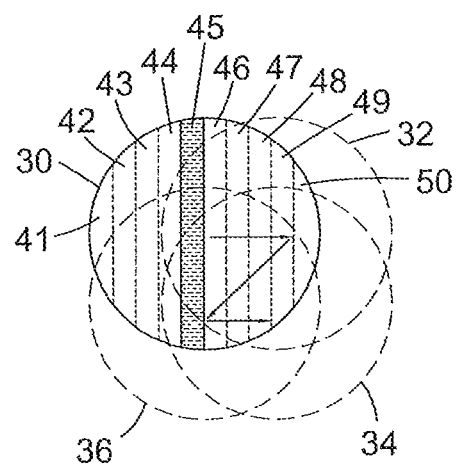
Fig. 7c Fig. 7d

SENSOR UTILISING OVERLAPPING SIGNALS AND METHOD THEREOF

The present invention concerns a device for determining the position and/or the shape of an object at a distance from the device.

The invention may be applied to detection and recognition devices in various fields, such as three-dimension controllers, sensors, machine vision, industrial tools, or musical instruments.

Currently, in order to determine the position or shape of an object or its movement, camera-based systems are often used. This is mostly the case in face-recognition devices or movement-detection devices.

Current limitations of such devices lie in their speed, precision, range and operability, as they require a high data bandwidth to obtain a high resolution, which is detrimental to real-time analysis.

Presently, standard consumer cameras can capture multi-million pixel images at a rate of 200 frames per second at best for a reasonable cost in terms of resources. Whilst higher frame rates are being achieved, the cost of associated with such higher frame rate is high and the amount of data created and requiring processing is not compatible with real time processing. While a temporal resolution of 200 frames per second is enough to record and determine the movement of objects within the camera field in most situations, this is not the case when said objects are moving at high speed, such as in the course of an impact between vehicles for instance.

The processing of images recorded by a camera is also limited by the resolution of the camera. In addition, current image processing techniques based upon wavelets have an error rate that can reach up to sixty percent. This is unsatisfactory.

SUMMARY

According to an aspect of the present invention there is provided a device for detecting the location of an object within two or more at least partially overlapping sensing volumes of the device. The device is configured to illuminate the sensing volumes and generate a sensing signal individually for each sensing volume by sensing light modulated by any object in the sensing volume. A form of spatial encoding is applied to the sensing volumes. The device comprising a processor that is configured to determine the presence or absence of an object in said sensing volumes based on the sensing signals generated for the sensing volumes and on said spatial encoding. As the sensing volumes overlap light modulated by a particular part of the object present in the overlapping sensing volume is sensed twice, once for each of the sensing volumes contributing to the overlap (or indeed more often if more than two sensing volumes overlap). The spatial encoding ensures that the effect the light has upon the object in the sensing volume is sensed so as to spatially vary over the sensing volumes (even though, as described below, such apparent spatial variation can be achieved in a considerable number of different ways). As these spatial variations between and/or within sensing volumes inevitably has a finer spatial resolution than the size of the sensing volumes the spatial information detectable by the sensing arrangement can have a resolution that is higher than the resolution provided by the size of the sensing volumes.

The sensing volumes may be illuminated with one or more light sources. The one or more light source can comprise one light emitter for each sensing volume. Alternatively a light emitter may illuminate more than one sensing volumes or even all of the sensing volumes.

An object present in one or more of the sensing volumes may modulate the light emitted by the one or more light source by reflecting the light towards one or more sensors that are employed to generate the sensing signals, cast a shadow on any such sensors or distort the light emitted by the one or more light sources in a manner that can be detected by any such sensors.

It will be appreciated that the sensing volumes may not need to be illuminated with visible light, also doing so is envisaged in one embodiment of the present invention. Alternatively or additionally light not visible to the human eye, such as infrared of ultraviolet light may be used for illuminating and sensing. By using light that does not occupy the visible spectrum it becomes possible to cover light emitters and/or light sensors with a material that is opaque to visible light but translucent to the type of light used for illuminating/sensing, thereby allowing the device to have a sleek outside appearance that disguises its electronic components without, however, impacting on the device's performance.

According to another aspect of the present invention there is provided a device for detecting the location of an object comprising a at least one emitter for emitting light and at least one sensor for receiving light of the type emitted by the emitter. The emitters and sensors are individually or jointly defining sensing volumes. The device is configured to generate individual sensing signals for each sensing volume. The sensing is indicative of how much any object present in the sensing volume has modulated light emitted by the at least on emitter into the sensing volume. The device is further configured to determine whether or not the individual sensing signals exceed a predetermined threshold indicative of the presence of an object within the respective sensing volume.

In a configuration where the sensors are arranged so that they receive light reflected by an objection within the sensing volume, the device may determine that an object is present in a sensing volume if a sensing signal generated by a sensor for the sensing volume exceeds a predetermined or dynamically determinable threshold. Conversely, if the sensors are arranged so that the presence of an object within the sensing volumes causes light from the light source to be partially or fully blocked, so that a shadow is cast upon the sensors, then the device can be arranged so that the reduction of signal intensity to below a threshold value is deemed indicative of the presence of the object.

Preferably the sensing volumes are overlapping each other along each of a first and second axes that are orthogonal to each other and individually extend along a third axis that is in turn orthogonal to both of the first axis and second axis.

Each of the sensing volumes may have associated with it a reference point in the plane defined by the first and second axis. This reference point may, for example, be located in the centre of the sensing volume in the plane defined by the first and second axes and/or coincide with a maximum illumination intensity for the sensing volume with this plane and/or coincide with the part of the sensing volume within this plane for which a sensor generating the sensing signal has its maximum sensitivity.

In a first approximation the device may be configured to treat a reference point within a sensing volume as being a point located on the object as long as it has been determined, for this sensing volume in question, that an object is present within the sensing volume. In doing so the device can determine an approximate area occupied by the object within a sensing space covered by plural sensing volumes if the sensing volumes are arranged along two intersecting axes in a plane as discussed above. In one embodiment the device defines those sensing volumes within which the presence of an object has been detected and that are surrounded by other sensing volumes for which the presence of an object has been detected as sensing volumes having a reference point within the object. Conversely, the reference point of sensing volumes within which the presence of an object has been determined but which are neighbouring at least one sensing volume for which it has been determined that no object is present within it are, in one embodiment, treated as being points located on an edge of the object. Thus the edges of an object within an overall sensing volume of the device can be detected in this fashion.

It will be appreciated that the coordinates of the reference point is predetermined. Different architectures of light emitter or light sensor arrays may have different defined coordinates for the reference points with the sensing volumes. However, given that the architecture of light emitters and light receivers is known the coordinates of the reference points can be defined and/or stored in a memory of the device.

The reference points may be in same relative position within the sensing volumes for all sensing volumes, e.g. in the same place (say in the centre of the sensing volume). The sensing volumes may be placed at regular intervals along one or more axes within a plane. In this case, and if the reference points are in the same relative position within the sensing volumes, the reference points can be evenly distributed across an sensing volume of the device. The same can of course also be achieved if an uneven/irregular distribution of the sensing volumes is compensated by placing the reference points at different locations within the sensing volumes so that a regular distribution of the reference points is nevertheless achieved.

The device may simply treat the coordinates of the so determined reference points as edge coordinates of the object. Alternatively or additionally the so defined edge coordinates could be connected to its nearest neighbour(s) to thereby trace the edge of the object. In this fashion the device allows displaying an outline of the object.

If a higher resolution or precision than the resolution or precision provided by the reference points in the sensing volumes is desired or required, then for sensing volumes that are deemed (for example using the above discussed method) to be located along an edge of the object the weighted average of the coordinates of the reference point within this sensing volume and of the coordinates of all surrounding sensing volumes can be calculated. Each of the coordinates of the reference points included in this averaging exercise are, for example, weighted by the signal intensity detected for this sensing volumes, so that the weighted average coordinates are biased to lie towards sensing volumes that, based on the generated sensing signals comprise a larger part of the object than other sensing volumes.

When starting from the method of determining improved/more highly accurate coordinates for the edge points of the object or indeed when using the above described more coarsely estimated edge coordinates as a starting point the accuracy of the detection of the edge of an object can further be improved in the following fashion. In particular the coordinates of the points deemed to be located on the edge of the object, irrespective of how they have been determined, can be used as a starting point for further refined computation. Specifically the weighted average between the coordinates of each "edge point" and the coordinates of a neighbouring reference point in a sensing volume that is also deemed to have received light modulated by the object can be calculated. The weighting can be done in the same way as described above. It will, however, be appreciated that, when doing so, the number of point calculated increases or can increase as the weighted average is calculated once for each pairing of an "edge point" with an neighbouring reference point within a sensing volume that has also received modulated light. The contours of the object determined by this method are consequently more finely defined.

The sensing volumes may individually illuminated by the light source. The device may, for example, comprise at least one light emitter for illuminating individual sensing volumes. Alternatively the light emitted by a light emitter may be directed towards/scanned over different locations/sensing volumes at different point in time, so that one light emitted illuminates more than one sensing volume.

The intensity of individual light illumination spatial encoding pattern may vary across the sensing volume, preferably continuously, and may comprise a local maximum and/or minimum. In one embodiment illumination intensity variations in one sensing volume are the same signal intensity variations in some or all overlapping sensing volumes. Alternatively light emitted to a first sensing volume has a different characteristic from light emitted to a second sensing volume. Light may for additionally or alternatively be emitted to first and second sensing volumes so that they are alternate in time, so that they have different spectra and/or different polarisation and/or different frequency and/or different amplitude and/or different phase.

The sensing volumes may be individually sensed by the sensor.

The device may form part of a motion sensor that is configured to sense the presence of an object within the sensing volumes at successive time points, define at least one reference point associated with a part of or point on the object for each time point and quantify movement of the object between the time points by calculating a spatial shift of the reference point between the time points.

The device may alternatively or additionally form part of a gesture recognition device that further comprises a gesture storage device and a processor that is configured to approximate at least part of an outline of a sensed object by determining those sensing volumes from among the sensing volumes within which the presence of the object has been determined as sensing volumes comprising an edge of the object if the sensing volume is not wholly surrounded by neighbouring sensing volumes for which it has also been determined that the object is present within them, treating a coordinate within the so determined sensing volumes as a coordinate of a point position along the edge of the object and connecting neighbouring such coordinates to create an approximate object outline. At least part or all of the approximate object outline is compared with gesture outlines stored in a memory of the gesture recognition device. An output signal identifying a recognised stored gesture is provided if a similarity between the compared at least part of the approximate object outline and a stored gesture outline is identified in said comparison.

The device may additionally or alternatively for part of an input device for connecting to a host computer and a motion sensor such as the above discussed motion sensor. An output interface for communicative connection with the host device is further be provided as part of the input device. The input device is further configured to send signals indicative of coordinates of points on a detected object, indicative of a direction or speed of motion of a detected object relative to the device or indicative of a detected gesture to the host device via the output interface.

The present invention, in some embodiments is advantageously distinguished over standard CCD device in a number of features. Importantly, given the desire for overlapping sensing volumes, no optical front end for focussing is required, so that the optical components used, if any, can be rudimentary and cheaply producible. Moreover, at least partly also because focussing is not of concern, the sensors can be spaced apart from each other. This allows (although it is not essential that the invention is implemented in this fashion) separate connection of each sensor to a processor, so that processing speed is limited by the abilities/bandwidth of the processor, rather than by a readout speed of the CCD). The dynamic range of the sensor can, moreover, be chosen more freely than is the case for an off the shelf CCD, so that charge accumulation times within the sensor can be chosen to balance the need for precision with the desire for read-out speed. Because of the use of spatial encoding interpolation between sensors becomes possible.

The above advantages over CCD contribute to a considerable enhancement of read-out speed in embodiments of the invention over those of known standard CCD, with sensing rates of in excess of 10000 scan of the entire sensing volume per second having been achieved with embodiments of the present invention. Embodiments using parallel acquisition can achieve up to 1 million scans of the entire sensing volume per second.

Moreover, given that in embodiments of the present invention there is no need for front end imaging optics and/or focussing, the sensor can have an active sensing range that extends to positions very close to the sensors. At the same time the sensors can cover a large surface area (limited only by the number of sensors available or desired and/or the available processing power). This means that the device of embodiments of the present invention can be very thin (say, for example, with a thickness that is the sum of the emitter/sensor height plus the thickness of a PCB the emitters/sensors and other components are mounted upon) whilst providing reliable sensing to a point very close to the upper surface of the device.

A device according to embodiments of the present invention is moreover advantageous compared to camera-based systems known in the art as it can exhibit higher precision and be more efficient in terms of energy consumption and use of computing resources.

With a full progressive scanning that can be performed in micro-seconds, any lag between the movement sent by the sensor and the movement seen on a screen or observed by a machine using the device as a sensor be drastically reduced. Consequently the device can detect very fast movement and thus offer predictive motion detection, for example for the purpose of impact pre-calculation, or simply detect much faster movements.

A device according to embodiments of the invention can also determine the position of an object with a precision that can reach down to less than a tenth of a millimeter.

The position, shape and feature recognition success rate reaches up to almost a hundred percent thanks to unique type of data sensing used in embodiments of the invention, allowing the use of computationally inexpensive interpolation techniques and efficient multi-resolution signal processing. It will be appreciated that, in CCD the spatial resolution achievable depends on the number of pixels of the device. In embodiments of the invention in contrast a resolution that is higher than the resolution provided by the density of the sensing volumes/sensors and emitters can be achieved. In particular the above mentioned spatial encoding used in the overlapping sensing volumes the data acquired carries additional spatial information that can form the basis for the use of interpolation techniques which, in turn, allow increasing the spatial resolution achieved in embodiments of the invention beyond that defined by the density of the sensing volumes provided. If the spatial encoding is provided by a physical feature, such as gradients in illumination of sensing volumes or gradients in the sensitivity of sensors, then the improvement in resolution is only limited by those hardware features that limit the detection of these improvements. In practice this may mean that the improvement in resolution may be limited by the resolution of a ADC used for converting detected analogue signals into digital signals.

It will be appreciated that this is achieved whilst avoiding the need to base computation on an increased number of signals, so that the computational demand of data processing in the embodiments is low and so that the above mentioned very high frame rates can be achieved. As also mentioned above, detection accuracy in embodiments is very high. This has to be contrasted against feature recognition accuracy of know techniques, such as those based upon wavelets, which have an error rate that can reach up to sixty percent.

As the processes employed for signal processing are not computationally demanding the required processing power is also much lower than is the case in other shape recognition techniques. This enables on-board processing and further increasing the speed of the calculation.

Image distortion artefacts known from camera devices which require the use of lenses or optic deformation devices when the image is bigger than the sensor size are also avoided in the preferred embodiment as the need for optical components has been eliminated. The present invention therefore further differs from current light-field (plenoptic) camera systems.

Indeed, a device according to embodiments of the invention may perform measurements in three dimensions regardless of the size of the object to be measured, thanks to the fact that the sensing volumes can be distributed over a surface, and its proximity to the sensors.

There is moreover no need for the emitters and/or sensors to be arranged in a specific fashion. Instead, the sensors/emitters can be arranged in any way suitable for the size and/or type of object that is predominantly to be sensed, as long as the overlap between the sensing volumes is preserved. Embodiments of the invention are consequently very flexible in terms of implementation and range and can easily be miniaturized. This is also because fewer sensors are required than in conventional sensing arrangements (such as CCD) and as no front end optics is required. In one embodiment only a single emitter/sensor pair can be used to create the two required sensing volumes or more, say by defining the two or more volumes consecutively.

A system according to embodiments of the invention can be built with various sources of emissions, for example an array of power efficient infrared LEDs, an array of organic LEDs on a film, scanning laser lines and arrays, etc. Consequently embodiments of the invention can be used in both short and long range sensing applications.

A device according to embodiments of the invention may also be scaled to any dimension (on a chip at micrometer resolution for example), and has no restrictions in terms of shape. It can also be made modular using a repetitive (tiled) spatial encoding pattern layout. As such it can sense from an extended surface, e.g. a wall, a table, a vehicle surface, or any other surfaces, whether it planar or not.

The invention is moreover suitable for use in a wide range of applications, which cannot be presented in the present disclosure in an exhaustive manner.

The device can, for example, be used to observe a surface and to quantitatively or qualitatively determine the interaction of an object, such as, for example, a human finger, with the surface. The observed surface may be rigid (in the sense that it does not significantly deform under the impact that is to be observable in the normal operating mode of the device) or flexible (so that deformation of the surface, when subjected to forces the observation of which the device is designed to observe, occurs). The device can calculate the speed and angles of incidence of the impact of an object onto the surface and/or the subsequent deformation of the surface, its tension, pressure, and/or friction. The device can do this either based on the deformation of the surface under the impacting force or, if the impacting object is deformable (such as a human finger), by observing a footprint that the object occupies on the surface and a change of this footprint over time. The surface area occupied by a human finger touching the surface, for example, changes depending on the amount of pressure applied onto the surface, so that the device can sense the pressure applied by the finger (even if the surface is rigid) and the speed with which it has been applied. It will be appreciated that, for this purpose, the object providing the reference surface has to be at least partially transparent to the light emitted and sensed by the device.

When using a surface as reference, it can sense any movement and velocity of objects before, during and after impacts above the surface.

When the device is used as a sensor in the field of sound control, for example as an electronic version of a musical instrument in particular, the device, when equipped with the herein described shape recognition function, can recognize objects used to play the instrument on the fly and control different parameters of a sound generator depending of the recognised object used for strokes (hands, drumsticks, mallets, brushes, etc.).

For instance, a device according to the invention may measure the size of objects in contact with a surface (e.g. sticks on a drum membrane) during impacts or friction, but also provide mapping of precise areas of said object to estimate the impact the object would have had, had it been used in the same manner to play the musical instrument emulated by the device. Based on stored characteristics or parameters of the recognised object, the device can then output (for example to a connected host computer) an indication or representation of the sound the object would have created on the emulated musical instrument, thereby allowing a precise reproduction of the sound.

Moreover, a device according to the invention may measure position of objects on the surface. In doing so different zones of the device can be assigned different functions. Additionally or alternatively, by detecting the position of the object on the device properties of emulated musical instruments that change with changing position of the object on the instrument, for example changes in the sound of virtual drums, can also be emulated. It is also envisaged that the device may be used as a virtual turntable, wherein virtual vinyl disc rotation is controlled.

As mentioned elsewhere, the overlapping zone of neighbouring sensing volumes of the device can extend at least from the reference location of a first light illumination spatial encoding pattern to a reference location of a second light illumination spatial encoding pattern. This allows for continuous (seamless) signal acquisition and thus much more precise signal processing and therefore measurement and shape recognition can be ensured. In one embodiment at least one parameter of the light signal distribution varies continuously over the light illumination spatial encoding pattern.

In order to facilitate the signal processing, the reference locations of each light illumination spatial encoding pattern can be evenly distributed over the surface occupied by the light illumination spatial encoding pattern.

According to an advantageous embodiment, a way to make the light signals discernible is to have the signal structuring means further structure the light emitted by the light emission means so that the light signals of the first light illumination spatial encoding pattern and the second light illumination spatial encoding pattern are alternate in time.

According to an another advantageous embodiment, a way to make the light signals discernible is to have the signal structuring means further structure the light emitted by the light emission means so that the light of the light signals the first light illumination spatial encoding pattern and the light of the light signals of the second light illumination spatial encoding pattern have a different spectrum.

According to an another advantageous embodiment, a way to make the light signals discernible is to have the signal structuring means further structure the light emitted by the light emission means so that the light of the light signals of the first light illumination spatial encoding pattern and the light of the light signals of the second light illumination spatial encoding pattern are polarized differently.

According to an another advantageous embodiment, a way to make the light signals discernible is to have the signal structuring means further structure the light emitted by the light emission means so that the light signals of the first light illumination spatial encoding pattern and the second light illumination spatial encoding pattern differ in frequency, amplitude or phase.

According to an another advantageous embodiment, a way to make the light signals discernible is to have the signal structuring means further structure the light emitted by the light emission means so that part of the light signals of the first light signal spatial encoding pattern and the second light signal spatial encoding pattern alternate in time.

In order to further facilitate the signal processing, the signal structuring means further structure the light emitted by the light emission means so that the variation of the light signal over the surface of the first light illumination spatial encoding pattern is identical to the variation of the light signal over the surface of the second light illumination spatial encoding pattern.

According to a preferred embodiment, the position of the object on the surface being larger than the distance between at least two reference locations, the signal processing means determine the position of the object by determining the position of the centre of mass or weighted position coordinates of a series of interpolation points.

The operating range of individual sensors is defined by minimum and maximum thresholds. The minimum threshold is defined by the minimum value that can be sensed above the noise floor of the entire system, whilst the maximum threshold is the maximum signal value that can be detected from the particular device architecture chosen, i.e. for the particular emitter/sensor geometry and amplifier and ADC settings. The maximum threshold ideally is slightly below the maximum point of the entire system, such as saturation of sensors and/or amplifiers.

It will be appreciated that, in most embodiments of the invention, light received at the centre of one sensing volume (or indeed at any reference position within the sensing volume) comprises contributions not only from a light source illuminating the sensing volume in question but also from light sources illuminating the overlapping sensing volumes on either side thereof. Ideally each of the neighbouring light sources would provide a zero contribution beyond the reference point. However, in practice this is difficult to achieve. In some embodiments the transition of interpolation from a first pair of sensing volumes to a second pair of sensing volumes (wherein both pairs share a sensing volume) therefore has to be actively managed in that the undesired contribution from a light source is ignored during interpolation. A decision at which point a contribution is ignored may be made once the ratio of contributions from two neighbouring sensing volumes is below (if the contribution from the sensing volume that is to be ignored is in the denominator of the ratio) a particular threshold or above (if the contribution from the sensing volume that is to be ignored is in the numerator of the ratio) a particular threshold. This threshold value assures continuity of interpolation across multiple spatial encoding patterns.

It will be appreciated that the same principle applies in situations where the sensing volumes are not defined by the illumination spatial encoding pattern of emitters/light sources and are instead defined by other means, such as overlapping sensitivity ranges of sensors. Alternatively or additionally the point at which a contribution from a sensing volume is ignored/replaced by the contribution from a sensing volume located on an opposite side can be defined by means of a reference curve or LUT. This can be particularly advantageous in situations where a ratio of contributions from overlapping sensing volumes changes with distance from the sensor.

BRIEF DESCRIPTION OF THE DRAWINGS

Embodiments of the invention will now be described, by way of example only, and with reference to the following drawings in which:

FIG. 7 is a graphical representation of light illumination spatial encoding patterns comprising an overlapping zone the signals of which are alternate in time according to another embodiment of the invention;

DETAILED DESCRIPTION

Figure 1:
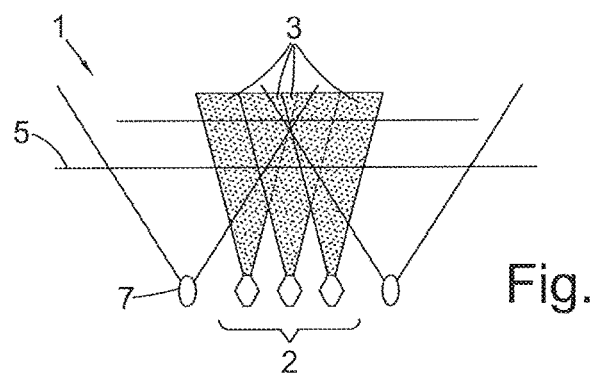
FIG. 1 is a graphical representation of a device according to a particular embodiment of the invention.

To detect the location and/or movement of an objection in an industrial context a high frame rate is desirable. Preferred embodiments of the present invention provide a way of accurately sensing the presence/location of an object within the sensing volume of a device by defining two or more at least partially overlapping sensing volumes. These sensing volumes are illuminated and light modulated by any object in these sensing volumes is detected individually for each sensing volume. Spatial encoding is used to allow later distinction between light originating from different locations in an overlapping region of the sensing volumes. The detected signals from the sensing volumes and the spatial encodings then form the basis for determining the location of any objection within the sensing volumes.

It will be appreciated that, by illuminating a particular sensing volume many points on any object that may be present in the sensing volume will modulate (e.g. reflect, refract or diffract) light impinging upon the object. A sensor detecting thus modulated light may, for example, detect a sum of all such modulated light originating from a plurality of points on the object, so that, in this example, a sum of all light originating form parts of the object within the particular sensing volume under investigation is detected. It is emphasised, however (and as discussed in more detail below), that such summation of light can also be achieved in other ways.

The amount of light received by a sensor from any given point of an object within a sensing volume depends on a number of factors, including the amount of light impinging upon the object, the optical properties of the object, the distance of the object from a light sensor and the spatial encoding.

Spatial encoding can be achieved in a number of ways. These include (but are not necessarily limited thereto) only having two sensing volumes partially overlap. In this configuration on object that is partially present in one or both of the overlapping sensing volumes will modulate different amounts of light for both sensing volumes, depending on how much of the object is present in the respective sensing volumes. The signal received for each sensing volume can therefore be interpreted as indicative of the portion of the object within each sensing volume. The thus determined signals, together with information about the spatial encoding (in this instance the distance and overlap of the sensing volumes) can then be used to determine the location of the object as described in further detail below.

An additional or alternative manner in which spatial encoding can be applied in an embodiment of the present invention is to illuminate the sensing volumes in a non-homogenous manner. It will be appreciated that, in this case the amount of light modulated by the object within the sensing volume does no longer only depend upon the fraction of the sensing volume occupied by the object. Instead the amount of light modulated by the object also depends on the local intensity distribution of the light impinging upon the object. The amount of light received at a sensor is again the sum of all light modulated by the object and directed at the sensor. The spatial variance in the illumination intensity further modifies the amount of light received as each non-homogenous illumination spatial encoding pattern necessarily has a maximum and minimum value. For each sensing volume a reference coordinate is defined. This reference coordinate may depend on the spatial distribution of light within the sensing volume or may, alternatively be placed in a different location with the sensing volume. The reference coordinates of two neighbouring overlapping sensing volumes are then used as a starting point for determining the location of an edge of an object occupying parts of one or both of the sensing volumes or indeed the location of the object itself. One way of approximating the edge of the object is to determine a weighted average of the reference coordinates, wherein the received signal intensity is used as a weighting factor.

In another embodiment the illumination profile used for both sensing volumes is flat but the sensitivity of a sensor detecting light from the respective sensing volumes differs over the sensing volume. The net-effect of this configuration is the same as that achieved by the above discussed arrangement in which the illumination is non-homogeneous and processing/estimation of object edges can be performed in the same fashion.

It will be appreciated that, instead of only varying the illuminating light distribution spatial encoding pattern or only the light sensitivity spatial encoding pattern of sensors it is also possible to vary both the illuminating light distribution spatial encoding pattern and the light sensitivity spatial encoding pattern of sensors. Variations (both in a configuration of this nature and in the above discussed configurations) may be along one dimension or along two dimensions when measured in a plane intersecting or perpendicular to the direction of propagation of the light. It will be appreciated that in embodiments in which the light distribution spatial encoding pattern as well as the sensing spatial encoding pattern are varied each along one dimension, the direction of variation for the two can be different, so that the net effect is a two-dimensional variation.

Whilst the above examples have focussed on sensing volumes that are only partially overlapping in other embodiments the sensing volumes may be fully overlapping, so that both sensed signals originate from the same volume. The above discussed spatial variations then facilitate an approximation of the location of an object or an edge of the object that is considerably more precise than the resolution provided by the sensors.

Whilst preferable independently operated/operatable sensors are used in the above described embodiment, as situation in which a standard CCD is used for sensing is also envisaged. An arrangement of this nature of course sacrifices the frame rate advantage that can be achieved by independent sensors but provides the advantage that standard components may be used and operated using software means implementing an embodiment of the present invention. If a CCD was used a resolution may be achieved that is higher than a required resolution. Conversely, whilst independent sensors sum the light emitted by a larger area of any object in the sensing area, a CCD will only receive light from a limited area of the object. In one embodiment sensing volumes monitored by the CCD are therefore defined so that signals received by a plurality of pixels are deemed to contribute to a signal of a sensing volume. Signals received from pixels within the so delimited sensing volume are simply added in software to generate a single signal.

It is equally envisaged that only a small number of light emitters and/or receptors could be used for illuminating various sensing volumes and/or sensing modulated light from these sensing volumes. Light from a single light emitter may, for example, be directed at different sensing volumes at different points in time, whilst a single receiver observes modulated light received from the different sensing volumes. The switching between different sensing volumes required for this can be achieved very quickly, so that the number of times a complete sensing space covered by the device is investigated can still be very considerable and certainly an order of magnitude higher than what could be achieved with a standard commercial CCD.

Overview of a System According to an Embodiment

Figure 19:
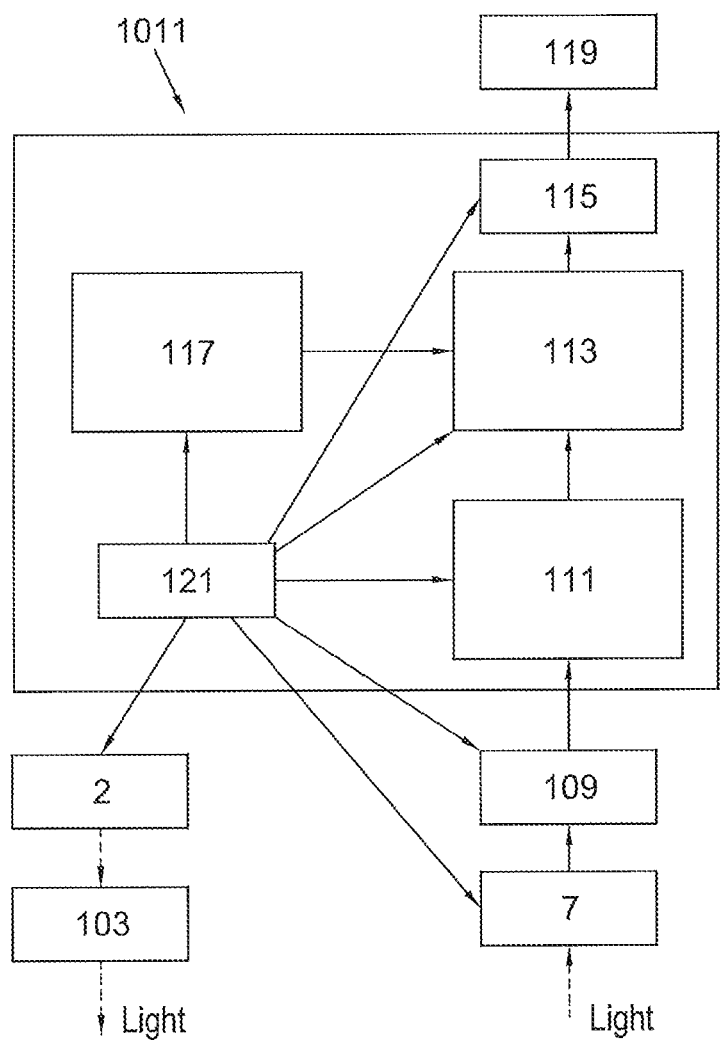
FIG. 19 is a schematic of a system according to an embodiment.

Turning now to specific embodiments of the invention, FIG. 19 shows a system 1011 for determining the position and/or shape of an object according to an embodiment. The system comprises light emitting means 2 which emit light, overlapping spatial encoding pattern structuring means 103 which structure the spatial encoding patterns of light emitted from the light emitting means and light sensing means 7 which sense light which has been emitting from the light emitting means 2 and subsequently reflected by an object to be detected. One or more of either the light emitting means, overlapping spatial encoding pattern structuring means 103 or light sensing means 7 also comprise features enabling discrimination between light reflected from one light spatial encoding pattern and an overlapping light spatial encoding pattern. This process will be discussed in more detail below.

Although, in the embodiment of FIG. 19, the overlapping spatial encoding pattern structure means 103 is located neighbouring to the emitter, it can be positioned anywhere in the light path between the emitting means 2 and the sensing means 7. Indeed, it may also be integral in either means.

The light emitting means 2 may comprise one or more LEDs, one or more lasers, one or more OLEDs, an electro luminescent material or surface, a light emitting array or any other device or plurality of devices capable of emitting light.

The light sensing means 7 may comprise high-speed photodiodes, inorganic or organic photodiodes, organic photosensors, printed photosensors, a phototransistor, a sensing array, charged coupled device (CCD) sensors, complementary metal oxide semiconductor (CMOS) sensors, cameras, a photo-darlington or any other device capable of sensing light. Each sensor can be an individual electronic component or an element of a microchip or even deposited or printed as a layout on a surface.

In an embodiment, the sensor(s) 7 provide an output signal, which is proportional to the intensity of light received. The response of sensor(s) should be fast enough to capture variations in light intensity due to the movement of the object from which light is reflected or to accommodate scanning needs which are described in detail below.

When object moving at high velocity are to be detected, the sensors are preferably photodiodes.

The overlapping pattern spatial encoding means 103 may comprise mirrors, optical filters, front-end optics, lenses, liquid crystals, pinholes, film filters and lenses, a micro-lens array, a mask or masks, applying analogue or digital post processing using an array of coefficients, varying the sensitivity of sensors 7, varying the emitter intensity of emitters 2, using light emitters that have a spatially non-uniform emission profile as part of the light emitting means 2 and spacing individual light emitters of the light emitting means 2 so that the overall light spatial encoded pattern (or parts thereof) created by the light emitting means 2 at a target depth or at a range of target depths comprises a desired structure, using a light sensing means 7 that has spatially varying/patterned sensitivity or any other means of creating overlapping light spatial encoding patterns. The nature of these spatial encoding patterns will be described in detail below.

For design simplicity the sensor or sensors 7 and/or the emitter or emitters 2 themselves may comprise built-in front-end optics, a specific shape or masks, filters or inherent location/directional sensitivity properties that allow the sensors or emitters once arranged in an appropriate layout, to perform the role of the overlapping pattern spatial encoding means either partially or in totality. Indeed, the overlapping pattern light spatial encoding means can be located anywhere in the light path between and inclusive the emitting and sensing means. It can also in certain cases be created by a carefully designed layout of light emitting or/and light sensing means, using the lighting or sensing means inherent directivity spatial encoding pattern properties. In a further embodiment, arrays (pixel emitters/sensors) of emitting or sensing elements for each spatial encoding pattern may be employed, wherein different elements (or even each element) generate different intensity or sensitivity coefficient. These coefficients are used to create the plurality of signals of the spatial encoding pattern and create a pixel version of the spatial encoding pattern. These coefficients can be created in analog (i.e. such that each pixel has a different signal or a signal with various levels of amplification according to position) or the digital domain (each pixel has a different signal or coefficient depending on its address or position).

Examples of the overlapping pattern spatial encoding means integral to the emitters and/or sensors include built-in front-end optics, specific shapes or masks, filters or inherent location/directional sensitivity properties that allow the sensors or emitters once arranged in an appropriate layout, to perform the role of the overlapping pattern spatial encoding means either partially or in totality.

In an embodiment, the overlapping pattern light spatial encoding means is created digitally, for example by employing an array of digitally controlled emitters that emit a plurality of light signals to represent the spatial encoding pattern(s).

The overlapping spatial encoding pattern discrimination means may comprise optical and electronic filters or modulators such as steering means (such as a steering mirror or steering liquid crystals), strobing means (such as liquid crystals, electric switcher(s), multiplexers and demultiplexers, electronic shutters, electronic controllers, means for scanning light across the sensing volume, means for identifying overlapping wavelength or polarisation, passive or active filters, signal modulators or signal encoders and/or decoders.

The system 1011 of FIG. 19 further comprises an acquisition means 109 which converts the data received by the sensing means 7 into a form suitable for processing. The acquired data is fed to a streaming memory 111 where it may be stored temporarily or permanently. A processor 113 performs calculations on the sensed data using data provided by a reference memory 117. The nature of the calculations performed and the data stored by reference memory 117 will be discussed in detail below. The results of the calculations are passed to communication portion 115 which outputs data 119. The data may be output to a computing device, network or as a file via wired or wireless communication.

The acquisition means 109 may comprise, for example, an amplifier, an analog filter, a digital filter, an ND converter if the sensor/s are analog or a digital adapter. The acquisition performed by the acquisition means may be serial or parallel acquisition. The streaming memory module 111 may momentarily store single measurement scan values for each individual sensor of the light sensing means or for some of these individual sensors for measurement operations (for example, as an array), or it may momentarily store multiple scan values for dynamic measurements such as velocity calculations (for example, as multiple arrays). It would be appreciated through that in another embodiment the streaming memory 111 may be omitted, so that measurement values are directly communicated from the acquisition means 109 to the processor 113.

The reference memory 117 may store, for example, calibration or reference values, look up tables or curves, layout information and measurements, system thresholds, mathematical operations, and values of constants, variables or filters.

The processor 113 may be any type of computing device that is capable of performing the computation mentioned below. The processor 113 may, for example, be a field programmable gate array, and ASIC or a microprocessor that, when active, executes program code that causes it to perform the desired calculations. The program code is stored in a non-volatile memory of the device of 1011, for example in the reference memory 117 or in another, unillustrated memory and is shadowed to RAM for execution by the processor 113.

The calculations performed by processor 113 may comprise calculations relating to, for example, the presence or otherwise of an object, position, size, velocity (in 1D, 2D or 3D), angle or orientation, contact with a surface, size of contact area with a surface, surface deformation, extreme points, such as the tip or a ridge, of an object, centre of mass of an object, pressure on a surface, interaction with a surface, shape recognition or feature detection.

In one embodiment, system 1011 further comprises clock and synchronisation controller 121 which controls the timing of some or all of the modules in the system. The timing control performed by the clock and synchronisation controller 121 may comprise strobing, sequencing, staggering or alternating. These timings will be discussed further below. The clock and synchronisation controller 121 may synchronise, for example, signals, multiplexers and demultiplexers, AD and DA conversion, signal delays, time stamping, filtering and processing tasks.

It will be appreciated that, although various components of system 1011 are shown as individual components functions performed by some components may in a practical implementation be performed by joint electronic. For example, it is envisaged that the functions of the clock and synchronisation controller 121 can instead, completely or partially be provided by the controller 113.

Example of an Emitter/Sensor Configuration

FIG. 1 shows a schematic illustration of a configuration of the emitter 2 and sensor 7 according to an embodiment of the invention. In the embodiment illustrated in FIG. 1, light emitting means 2 comprises a number of light emitters and illuminates a volume. In an embodiment, the illuminated volume comprises a plurality of illuminated spaces 3. When an object is introduced into the space above the surface 5 (or indeed in any part of the volume illuminated by the emitters 2 in which light originating from individual emitters overlaps with light generated by neighbouring emitters 2), light emitted by the light emitting means 2 is reflected from the surface of the object towards one or more of the sensors of the light sensing means 7 where it is detected. The detection of such light therefore indicates the presence of an object. As described below, the configuration of the system is such that not only the presence but the position and shape of the object can also be detected.

As illustrated in FIGS. 2 (*a*) and 2 (*b*), a spatial encoded light illumination volume 3 is created by projecting the two-dimensional light illumination spatial encoding pattern 4 (shown here in the form it has in a surface 5 spaced away from the light emitting means 2). In the embodiment of FIGS. 2(*a*) and 2(*b*), light illumination spatial encoding pattern 4 is a two-dimensional spatial encoding pattern of light intensity created on notional two-dimensional surface 5 by the emission of light from the light emitting means 2. The intensity of light on the two dimensional surface 5 varies spatially across the surface according to the spatial encoding pattern 4. In an embodiment, the spatial encoding pattern comprises a gradient of light intensity across the surface. Other embodiments will be described below. The term "light illumination spatial encoding pattern" is to be understood to mean a two-dimensional surface at any working distance within a sensing volume over which light is either emitted or sensed according to a predetermined layout, or a gradient of light intensity. The terms "light illumination pattern", "light pattern' or "pattern", or "gradient intensity pattern" will be used indifferently in the rest of the description. The term "gradient" is to be understood to mean a variation of light intensity that can be linear, logarithmic, or any kind of function that can increase or decrease progressively from a reference location.

The progress of light from the light emitting means 2 towards and beyond the surface 5 used above to illustrate the light illumination spatial encoding pattern 4 (along the z-axis in FIG. 2(*a*)) defines the light illumination volume 3. Any two-dimensional light illumination spatial encoding pattern will form a three-dimensional volume in the direction of travel of the light. The two-dimensional light illumination spatial encoding pattern can be defined without reference to the plane/surface 5 (and it is emphasised that it is not essential for the present invention that the spatial encoding light pattern is defined with reference to such a plane). Alternatively, however, other ways of defining the spatial encoding pattern, say by defining the spatial distribution of the light emitters that form the light emitting means 2 and emission angles of the light emitters. Referring to the surface/plane 5 can nevertheless be useful, in particular in arrangements where the light emitters of the light emitting means 2 are not all located in a single plane.

In an embodiment, the shape of light illumination volume 3 is conical, as shown in FIG. 2(*a*). In another embodiment, the shape of light illumination volume 3 is cylindrical, as shown in FIG. 2(*b*). If the light illumination volume 3 is conical, it can be assumed to form a cylinder if the opening angle of the cone is small enough, thus simplifying most calculations.

Returning now to FIG. 1, when an object is located above the surface 5, light is reflected from the surface of the object towards the sensors 7. Using the intensity of the light detected by the sensors 7, the position in a plane parallel to the plane 5 as well as along the z-direction, size and shape of the object can be calculated.

The intensity of the light received by the sensors 7 will depend on the distance of the object from the sensors, on the fraction of the cross-section of the light illumination volume 3 that is occupied by the object, on the reflectivity (or, more generally, on the optical properties) of the parts of the object within the light illumination volume 3 and on the light illumination spatial encoding patterns 4 which determine the intensity of light at the point at which it is reflected from the object surface.

According to the inverse square law of light, intensity is inversely proportional to the square of the distance from a light source. Thus, in an embodiment, the device is calibrated such that the intensity of light received by the sensors 7 is combined with data relating to the light illumination spatial encoding pattern to calculate the position of the object in 3-D space. Details of an embodiment of this calculation are described in detail below.

In this embodiment, the sensors may have uniform sensitivity for all light reflected from an object. Other embodiments where the sensitivity of sensors varies with position will be described below. As described in relation to FIG. 19, a structuring means (indicated by reference numeral 103 in FIG. 1) for the spatial encoding light pattern which gives rise to the particular pattern structure of pattern 4 can be integral in the emitters 2, such as inherent to the emitters' intensity directivity spatial encoding pattern or light emitter spot profile, or may be provided by a separate means positioned in the light path between the emitters 2 and the sensors 7.

Examples of light illumination spatial encoding patterns intensity characteristics according to embodiments are shown in FIGS. 3 to 4, where FIG. 3 illustrates a light illumination spatial encoding pattern having a circular shape and FIG. 4 illustrates a light illumination spatial encoding pattern having a square shape.

In the embodiments shown in FIGS. 3 and 4, each light illumination spatial encoding pattern 4, 4', 4" and 4''' comprises a spatial encoding pattern of light intensity distributed over a surface contained within light signals volumes 3.

Figures 3A, 3B:
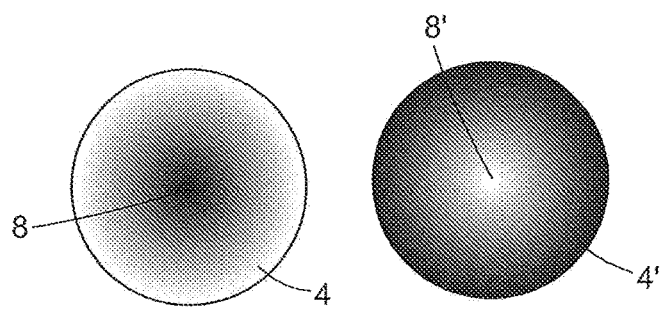
FIG. 3 is a graphical representation of a detail of FIG. 2 according to different embodiments of the invention.
Figures 4A, 4B:
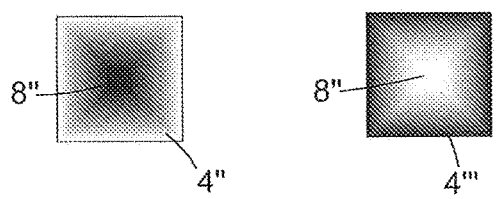
FIG. 4 is a graphical representation of a detail of FIG. 2 according to different embodiments of the invention.

In the embodiments of FIGS. 3 and 4, each light illumination spatial encoding pattern 4, 4', 4" and 4''' comprises a reference location, respectively 8, 8', 8" and 8''', that is either a local maximum in which the light intensity created by the emitter is most intense as shown in FIG. 3*a* and FIG. 4*a*, or a local minimum in which the light intensity created by the emitter is at its least intense over the intensity area shown as shown in FIGS. 3b and 4a. When a local maximum is present, the light signal gradually fades in intensity in one or several directions on moving away from the local maximum. When a local minimum is present, in contrast, the light signal gradually rises in intensity in one or several directions on moving away from the local minimum.

Whilst the local maxima and local minima are shown in FIGS. 3 and 4 using the appearance they would have in a plane on a surface that is located some distance away from a light emitter it will be appreciated that these local maxima/minima are in fact 3D volumes occupied by a maximum/minimum light intensity respectively and projecting away from the light emitter creating the local maximum/local minimum. The illustrations provided by means of FIGS. 3 and 4 are merely a cross-section of this 3D volume and its surrounding volume.

A reference location used in calculating the position and/or the outline of an object within the sensing volume of the device can be defined to coincide with either a local minimum or a local maximum within the illumination spatial encoding pattern generated by a light emitter or a local minimum or local maximum in the sensitivity of a sensor within a sensing volume.

Given that the location of local maxima and local minima in the space into which the light emitters project their light is known as soon as the geometry of the light emitting means 2 is established, these local maxima/minima can (although the invention is not so limited) reliably be used as reference locations to base the calculation of the position of an object upon which the spatial encoding light pattern is projected.

In one embodiment, the light spatial encoding patterns are arranged such that overlapping spatial encoding patterns have intensity gradations that vary in opposite directions, i.e. the light signal of one spatial encoding pattern gradually fades in intensity from a local maximum within the spatial encoding pattern towards the local minimum of the neighbouring spatial encoding pattern (or vice-versa).

In an embodiment, at least part of two or more light illumination spatial encoding patterns overlap or, equivalently, are superimposed on a given surface.

Figure 5:
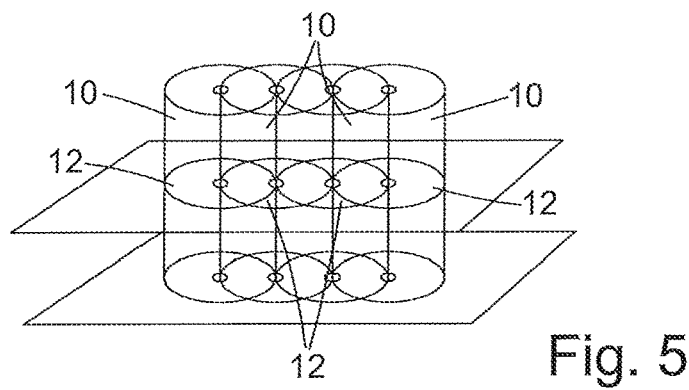
FIG. 5 is a graphical representation of light signal volumes according to a particular embodiment of the invention.

In FIG. 5, light intensity volumes 10 (shown, in approximation as being cylindrical) are superimposed onto neighbouring light intensity volumes. Their respective spatial encoding light patterns 12 in a given surface overlap.

In order to increase the accuracy of the measurements and/or to cover a larger surface, a plurality of identical light signal volumes may be projected such that respective neighbouring light signal volumes overlap with another.

In the embodiment of FIG. 1, there are three overlapping light illumination spatial encoding patterns 4. However, the number of signal spatial encoding patterns can be varied according to the type and size of the object to be sensed, the speed of said object, and the type of application in which the invention may be used. For some applications, two light illumination spatial encoding patterns are sufficient to determine the position of an object. For other applications, however, more than two light illumination spatial encoding patterns may be needed or preferred.

Preferably, light illumination spatial encoding patterns are arranged so that the reference location of one light illumination spatial encoding pattern does not coincide with the reference location of another light illumination spatial encoding pattern. Arrangements of light illumination spatial encoding patterns according to embodiments are shown FIGS. 6 and 7.

Figure 6A:
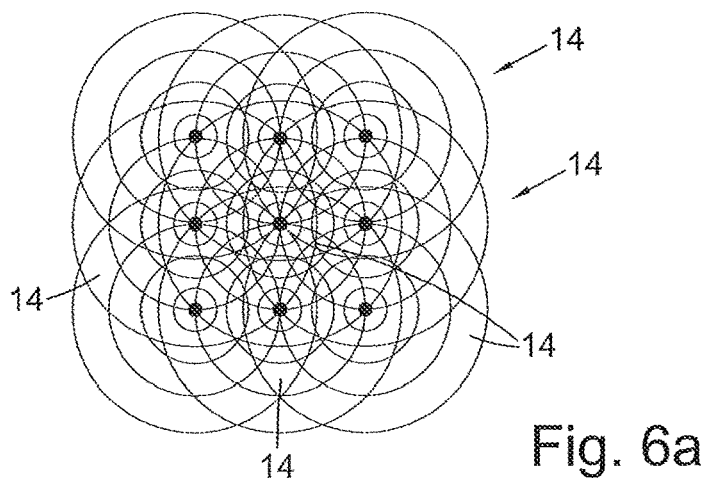
FIG. 6a is a graphical representation of light illumination spatial encoding patterns comprising an overlapping zone according to a particular embodiment of the invention.
Figure 6B:
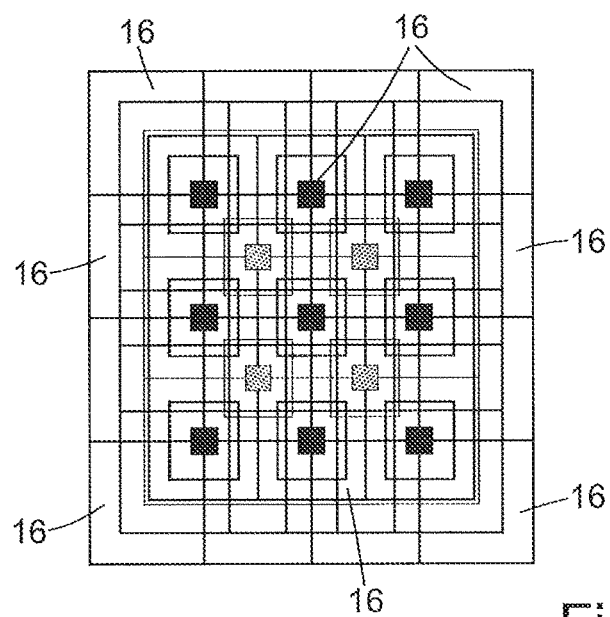
FIG. 6b is a graphical representation of light illumination spatial encoding patterns comprising an overlapping zone according to another embodiment of the invention.

FIGS. 6a and 6b each show a schematic illustration of an arrangement of light illumination spatial encoding patterns according to respective embodiments. The arrangement shown in FIG. 6a comprises nine superimposed light illumination spatial encoding patterns 14 each having a circular shape, and the arrangement shown in FIG. 6b comprises thirteen superimposed light illumination spatial encoding patterns 16 each having a square shape.

In the preferred embodiments illustrated in FIGS. 6a and 6b, light illumination spatial encoding patterns are arranged such that the light intensity of one spatial encoding pattern progressively evolves from its reference location to an neighbouring reference location of an overlapping spatial encoding pattern and vice-versa. The reference locations of each spatial encoding pattern are indicated with a solid/filled circle or square and correspond to the above discussed local maxima/minima. The circles and squares surrounding the reference locations indicates areas that have the same light intensity.

Consecutive light illumination spatial encoding patterns (i.e. neighbouring overlapping patterns) can be identical. They can also be complementary, i.e. when the intensity of light of one spatial encoding pattern increases in one direction, then the intensity of light of the other spatial encoding pattern decreases in the same direction across the overlap.

When two or more light illumination spatial encoding patterns are superimposed, light reflected from an area of overlap of two neighbouring spatial encoding patterns will comprise light originating in both spatial encoding patterns. In an embodiment, a light spatial encoding pattern discriminating means, as discussed briefly above in relation to FIG. 19, is employed to distinguish between the light reflected from one spatial encoding pattern and the light reflected from the other. A range of techniques can be employed to differentiate between the light reflected from one light illumination spatial encoding pattern and another. These include alternating the spatial encoding patterns themselves or applying different characteristics to the light in each spatial encoding pattern. Examples of different light characteristics that can be used to differentiate between neighbouring spatial encoding patterns include:

Inherent light signal characteristics such as colour, spectrum, etc.;

Polarization of the light

Alternative methods of projecting the light signal (light emitters creating the different spatial encoding pattern may, for example, be switched on/off at different times);

Modulating the light signal in frequency, amplitude, phase, etc.

In an embodiment alternating projection of overlapping spatial encoding patterns is employed, thereby enabling time differentiation of sensed signals. In this embodiment, the spatial encoding patterns are projected in a given sequence. As well as enabling differentiation of light reflected from overlapping spatial encoding patterns, this method also has the advantage of reducing energy consumption and/or may be useful in environments in which is necessary to reduce emission levels for safety reasons. Further, the data acquisition and conversion is simplified due to the serialized nature of the light data.

In a further embodiment, the light illumination spatial encoding patterns themselves are divided into zones which are independently scanned (with either a sensor or a light) at different moments of the signal obtaining phase (i.e. at different time intervals).

A temporal scanning topology according to an embodiment is shown in FIG. 7a. Four neighbouring light illumination spatial encoding patterns 30, 32, 34 and 36 are shown.

In this embodiment, light illumination spatial encoding pattern 30 is illuminated while its neighbouring light illumination spatial encoding patterns 32, 34 and 36 are left dark. Thus the light illumination spatial encoding pattern 30 is created/illuminated prior to its overlapping neighbours. Once the scanning of light illumination spatial encoding pattern is 30 is complete, light illumination spatial encoding pattern 30 will be turned off and light illumination spatial encoding pattern 32 will be illuminated and so on.

Activating light sources or sensors covering different sensing volumes in a sequential fashion, be that in the configuration shown in FIG. 7*a* or in different configurations, is, in general, envisaged as forming an embodiment of the present invention. A complete scan of a zone is achieved when all overlapping spatial encoding patterns comprising the said zone have been sequentially illuminated. Repeating the spatial encoding pattern scanning routine at fixed time intervals preserves the properties of velocity measurements of objects within the scanning zone. The timing of the sequence affects the velocity resolution offered by the system.

FIG. 7*b* shows a scanning topology according to another embodiment. In this embodiment, inner progressive scanning of the spatial encoding patterns themselves with, for example, a steering slit light or spotlight passing through a two-dimensional intensity filter for each spatial encoding pattern is conducted.

In the embodiment of FIG. 7*b*, the light illumination spatial encoding pattern 30 is divided into ten zones 41 to 50 which are scanned independently, one after the other, at different time intervals. The zones 41 to 50 can but do not need to be scanned in the numbered sequence. Once the complete scanning of spatial encoding pattern 30 is complete, an analogous process is performed on spatial encoding pattern 32, and so on. Such scanning may be achieved by blocking light emitted by an immovable light source using a LCD or other addressable mask, so that only light directed towards a particular one of the zones 41 to 50 can reach the sensing volume. Alternatively light emitted by an emitter may be directed to a desired zone 41 to 50 using a micromirror, for example a MEMS micro-mirror. Other ways of directing light so as to scan the sensing volumes in the above described fashion will also be known to the person skilled in the art.

In yet another embodiment, the temporal topology concept is applied using a steering system where the illumination is steered across at least a single spatial encoding pattern and strobed to reconstruct the desired overlapping spatial encoding pattern topology. A micro mirror or a liquid crystal steering system may be used for steering the spatial encoding light pattern. Strobing may be achieved by only activating the light source at desired time points, blocking light output at times at which the light spatial encoding pattern is not directed in a desired direction. Alternatively or additionally strobing may also be achieved by only activating the sensors when emitted light is imminent on a desired part of the sensing space/a desired sensing volume.

This steering design allows simplification of the device itself as in theory a single emission and sensing pair and steering device can sense a wider zone by emulating a large amount of overlapping spatial encoding patterns. In this fashion the number of control signals and hardware components, such as amplifiers, ADCs and acquisition means required can be reduced.

A configuration according to this embodiment is illustrated in FIG. 7*c*. In this configuration, the scanning of light illumination spatial encoding pattern 30 is steered from point 60 to 64 through point 62.

In an embodiment, two or more of the temporal scanning topologies described above are combined. For instance, FIG. 7*d* illustrates a scanning topology according to an embodiment in which progressive scanning is combined with strobe steering. Each strobe spatial encoding pattern (e.g. spatial encoding pattern 30, 32, 34 or 36) has also a time resolved inner progressive scan routine such as progressively scanning strips 41 to 50 shown in FIG. 7*d*. Combining two or more scanning topologies enables a much more sophisticated system to be created. In one embodiment, for example, initial scanning can use the spatial encoding pattern shown in FIG. 7*a* or 7*c* (or more generally, can use a scanning pattern that has a resolution of a single sensing volume), providing an indication of whether or not an object is within the scanning area of the device and a lower resolution indication of the position and/or shape of the object. The location and/or shape of the object can then be determined to a higher resolution or degree of accuracy using the scanning pattern shown in FIGS. 7*b* and 7*d* (or, more generally, can use a scanning pattern that has a resolution that is higher than the resolution of a sensing volume).

The progressive scanning described in relation to FIGS. 7(*a*) to 7(*d*) may also be implemented at the sensor with, for example an electronic liquid crystal masking system revealing the spatial encoding pattern progressively in time. The inner progressive scanning of each intricate spatial encoding pattern offers an added level of scanning precision where inner spatial encoding pattern scanning is time resolved and the output data is a temporal intensity curve associated to the scan pass of each overlapping spatial encoding pattern. A complete scan is the collection of several time resolved intensity curves of overlapping spatial encoding patterns.

In the above described embodiments, the light illumination spatial encoding patterns have been achieved by the spatial variation in the intensity of light emitted by the emitters 2. In an alternative embodiment, light sensing spatial encoding patterns are achieved by spatial variation in the sensitivity profile of the sensor or sensors. In this embodiment, analogously to FIGS. 2(*a*) and (*b*), a light sensitivity volume sensitivity volume is created by projecting a two-dimensional light sensitivity spatial encoding pattern in which the intensity distribution of the light varies in the third dimension as intensity decreases in proportion with the inverse square of the distance from the light source. In this embodiment, light sensitivity spatial encoding pattern is a two-dimensional pattern of light sensitivity created on a notional two-dimensional surface. The pattern of light sensitivity gives the degree of sensitivity with which light reflected from that point will be received by the sensor to which the spatial encoding pattern corresponds. In this embodiment, the light emitted by the emitters, is uniform and unvarying.

Analogously to the light illumination spatial encoding pattern in the embodiment described above in relation to FIGS. 1-7, when light sensitivity spatial encoding pattern is above and below the surface 5 in FIG. 2*a* in a direction parallel to the surface 5 (i.e in a direction intersecting z-axis in FIG. 2*a*) a light sensitivity volume is created. Any two-dimensional light sensitivity spatial encoding pattern will form a three-dimensional volume in the direction of travel of the light. This can be achieved by using one sensor for each sensing volume.

Returning now to FIG. 2*a*, when an object is introduced above the surface 5, light is reflected from the surface of the object towards the sensors 7. Using the sensitivity with which the sensors 7 detect the reflected light, the position, size and shape of the object can be calculated.

The intensity of the light received by the sensors 7 will depend on the distance of the object from the sensors according to the inverse square law, as discussed above. The actual data output from the light sensitive sensor will also depend on the light sensitivity spatial encoding patterns which determine the sensitivity with which light reflected from the object is detected by the sensors. Thus, the position of an object above the surface 5 can be determined using the data collected by the sensors 7. As in the above embodiment, the device is configured such that the intensity of light received by the sensors 7 and depending on object's distance is also encoded spatially by the light sensitivity encoding pattern to permit calculation of the position of the object in 3-D space. Details of this calculation will be described below.

As described in relation to FIG. 19, a structuring means (indicated by reference numeral 103 in FIG. 19) for the light pattern which gives rise to the particular spatial encoding pattern structure of spatial encoding light pattern can be integral in the sensors 7 (it may, for example, be inherent or specified to the sensors' intensity directivity pattern), or may be provided or enhanced by a separate means positioned in the light path between the emitters 2 and the sensors 7.

In an embodiment, the sensitivity spatial encoding pattern is created by introducing spatially varying filtering characteristics in front of the sensor. Examples include built-in front-end optics, specific shapes or masks, filters or inherent location/directional sensitivity properties that allow the sensors once arranged in an appropriate layout, to perform the role of the overlapping spatial encoding pattern structuring means either partially or in totality. The inherent directivity spatial encoding pattern properties of the sensors employed may also be exploited by incorporating it into specifically designed layouts of the sensors.

Light sensitivity spatial encoding patterns with the same shapes and configurations of the light illumination spatial encoding patterns 4, 4', 4" and 4'" shown in FIGS. 3 and 4 may be generated according to embodiments. In the case of the light sensitivity spatial encoding patterns, however, the reference locations 8, 8', 8" and 8'", can be set so that they correspond to local maxima of maximum sensitivity (FIG. 3a and FIG. 4a) or a local minima of minimum sensitivity (FIGS. 3b and 4a). It will though be appreciated that the reference location can be set in any other location within the light illumination pattern 4, 4', 4" and 4'". In the light illumination spatial encoding pattern 4, 4', 4" and 4'" shown in FIGS. 3 and 4 and there is a gradual change in sensitivity on moving away from the local maximum or local minimum.

These reference locations that become a hot (in the case of a local maximum) or dark (in the case of a local minimum) three-dimensional extruded zones once the light spatial encoding pattern is projected along a third axis (e.g. cylinder or cone shape when spatial encoding pattern is circular). The light sensitivity spatial encoding patterns are arranged such that overlapping spatial encoding patterns have sensitivity gradations that vary in opposite directions, i.e. the light sensitivity of one spatial encoding pattern gradually fades from a local maximum within the spatial encoding pattern towards the local minimum of the neighbouring spatial encoding pattern (or vice-versa).

In an embodiment, at least part of two or more light sensitivity spatial encoding patterns overlap or, equivalently, are superimposed on a given surface.

As with light intensity spatial encoding patterns, two or more light sensitivity spatial encoding patterns may be superimposed on to each other (e.g. FIG. 5). The number of sensitivity spatial encoding patterns can be varied according to the type and size of the object to be sensed, the speed of said object, and the type of application in which the embodiment invention may be used. For some applications, two light sensitivity spatial encoding patterns are sufficient to determine the position of an object. For other applications, however, more than two light sensitivity spatial encoding patterns may be needed or preferred.

Preferably, the light sensitivity spatial encoding patterns are arranged so that the reference location of one light illumination spatial encoding pattern does not coincide with the reference location of another light illumination spatial encoding pattern (as shown, for example, in FIGS. 6 and 7). Light sensitivity spatial encoding patterns analogous to the light illumination spatial encoding patterns shown in 6a and 6b can also be generated according to embodiments.

As with light illumination spatial encoding patterns, when two or more light sensitivity spatial encoding patterns are superimposed, light reflected from an area of overlap between two neighbouring spatial encoding patterns will comprise light originating in both patterns. As in the case of light signal patterns, light pattern discriminating means, as discussed briefly above in relation to FIG. 19, is employed to distinguish between the light reflected from one sensing volume and the light reflected from the other. A range of techniques can be employed to differentiate between the light reflected from one light illumination spatial encoding pattern and another.

Unlike the light intensity spatial encoding patterns, it is not always possible to apply different characteristics to the light in each spatial encoding pattern because a single emitter may provide the light to be reflected at several sensors. However, alternating sensing of overlapping spatial encoding patterns, steering and strobing analogous to that shown in FIGS. 7a to 7d may be employed with temporal sensing topologies.

In the embodiments described above, the spatial encoding pattern structure means 103 may be either a single component or a combination of components. A combination of components can produce the same effect of encoding light or spatial sensitivity profile as a single means; it can define one or several characteristics of the plurality of light signals or sensor signals. In either case, by the time that the light reaches the end of the light signal path (i.e. after it is received by the sensor), the structure of the spatial encoding pattern must be complete and have at least one reference location (local maximum or local minimum) and at least one gradient of intensity/sensitivity between the reference location and at least one neighbouring spatial encoding pattern reference location and vice versa.

In an embodiment, the spatial encoding pattern structure means 103 are static. For example, spatial variation in the detected light intensity may be created by a spatially varying sensitivity profile of the sensor or by a filter with spatially varying filtering characteristics placed in front of the sensor. Using static front-end optics or filtering means on light emitting means and/or the sensing means enables spatial variation in the sensing of a plurality of light signals. In another example, sensors with a sensitivity profile or emitters with an emission intensity profile are employed as the spatial encoding pattern structure means 103. Other examples include optical directivity angle lobes of sensors and/or emitters and employing other intrinsic properties of the emitting or sensing technology to generate a suitable spatially varying profile. Any design factor, such as masking, chemical deposition density of active layers, thickness of active layers, printed layout of active surfaces, molecular arrangements, which affects the spatial profile of a sensor or emitter can be used to generate a spatial encoding pattern and corresponding light signals.

Note that when static light spatial encoding means are employed, if a single sensor is employed for a given spatial encoding pattern, all the light signals from that spatial encoding pattern are detected by the sensor as a single value, i.e. the intensity of the light signals from the spatial encoding pattern as reflected by an object in the light path are effectively summed into a single detection value. If more than one sensor is employed for a given spatial encoding pattern, or if all the light signals within the spatial encoding pattern are not emitted at the same time, the signals received by each sensor are only a partial sum of the light signals from the spatial encoding pattern. If necessary, the partial sums may be combined electronically or digitally at a later stage in order to obtain the total value of the light reflected from the given sensing volume.

In another embodiment, the spatial encoding pattern structure means are dynamic. Examples include controlled liquid crystal filters, light valves, or digital shutters to dynamically create and differentiate overlapping spatial encoding patterns.

In another embodiment, the spatial encoding patterns are created digitally or electronically rather than optically using a plurality of emitters and/or sensors. In one example according to this embodiment, each of a plurality of signals, current or voltage driving a plurality of light emitting elements may be created with a different intensity coefficient thus forming a suitable spatial encoding pattern across the plurality of emitters. In another example according to this embodiment, a plurality of light sensing elements may each output a signal corresponding to light detected and each signal may be multiplied electronically or digitally with a different intensity coefficient to suit the sensing elements position and form a suitable spatial encoding pattern across the plurality of sensors. The advantage of this technique is that overlapping spatial encoding patterns can be created dynamically and changed over time using the same plurality of elements. The use of a diffusion filter can help to overcome any stepping effects arising in emitters or sensors when employed in such an embodiment.

In yet another embodiment, the plurality of light signals is generated independently of the sensor(s) and emitter(s) spatial sensitivity or intensity profiles by using additional optics and filters placed at some position in the light path between the emitter(s) and the sensor(s), thereby creating the conditions for spatially patterning the light signals.

The spatial encoding pattern discriminating means may either be integral with or independent from the spatial encoding pattern structure means. There are two requirements of the emitter-sensor-spatial encoding pattern structuring means-spatial encoding pattern discriminating means configuration: 1) to structure light so as to create intensity/sensitivity spatial encoding patterns and 2) to discriminate between overlapping spatial encoding patterns. These two goals may be achieved independently (i.e. the spatial encoding pattern discriminating means and the spatial encoding pattern structuring means are separate components) or simultaneously (i.e. the spatial encoding pattern discriminating means is integrated into the spatial encoding pattern structuring means).

An example of an independent configuration according to an embodiment is that of a system comprising light emitters which have static intensity filters front-end, and are arranged in a layout such that spatial encoding patterned light overlaps. The emitters are then individually controlled so as to strobe in sequence so overlapping is differentiated in time.

An example of a configuration according to an embodiment in which these two goals are achieved simultaneously comprises a steering light beam with intensity control performed by a signal from a driver that varies in intensity (e.g. DAC and light driver) wherein the spatial encoding patterned light is encoded and traced progressively such that the overlap between spatial encoding patterns is differentiated over time. Another example is that of light emitters having a set of spatial encoding pattern filters coupled with polarization filters to create and identify the overlapping spatial encoding patterns simultaneously.

In the case that the overlap between spatial encoding patterns is differentiated over time, usually, two or more cycles of a sequence or several sensing passes are needed (see, for example, the embodiments of FIGS. 7(a) to 7(d) are distributed over time so each sensing pass is individually sensing non-overlapping spatial encoding patterns, with the overlapping spatial encoding patterns complementing each other).

The nature of the sensors employed may make using a pattern discriminating means redundant. For example, sensors with an angle of view or cone shaped profile to create the overlapping spatial encoding patterns by layout may be employed. In this example, spatial encoding patterns can be "seen" at once without the use of a spatial encoding pattern discriminating means.

Figures 2A, 2B:
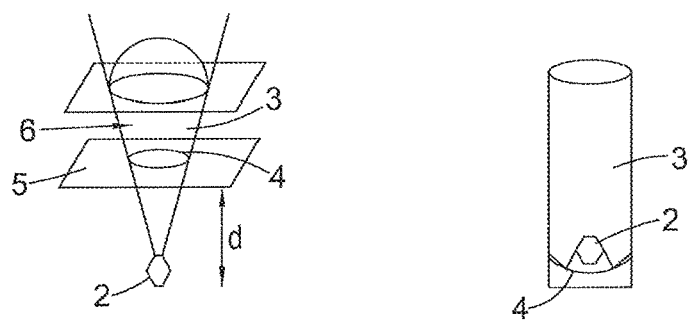
FIG. 2 is a graphical representation of a detail of FIG. 1 according to a first and a second embodiment.

Determining the position of an object that is at least partially contained within light illumination volume 3, as shown in FIGS. 1 and 2(a) can be done with maximal precision when the object is located at least at a distance d from emitters 2, that is, above the reference surface 5, or, equivalently within a sensitive volume 6, using signal obtaining means or sensors 7. The reference surface can be conveniently positioned to the distance at which the spatial encoding patterns 4 begin to overlap. Although the embodiment of FIG. 1 comprises light illumination spatial encoding patterns, the above will also apply in embodiments employing light sensitivity spatial encoding patterns or combinations of the two.

In an embodiment, the size of light signal and/or sensitivity spatial encoding pattern may be manually varied according to the detection volume desired by the user.

Minimum and maximum thresholds of distance will also exist because a minimum and maximum detectable light intensity is also inherent to the system. Beyond a certain distance from the emitter, the intensity of light, even at a local maximum, will have diminished to such an extent that the sensors are not capable of detecting the light reflected from the sensing space (or possibly, distinguishing such light from ambient light). Beyond the threshold values which depend on spatial encoding pattern size, there is therefore also a threshold intrinsic to the light intensity of the emitters and sensitivity of the sensors. For extended operating range, optimisation, energy efficiency and safety the system can automatically detect out of range signals comparing sensed signals with minimum, maximum or range thresholds to control amplification gain, light emission intensity driving analog or digital signal range or switch to different circuits or sensors and therefore considerably augment the sensing range of the system. (e.g. padding the gain when sensed signal exceeds a value or switch to a higher gain amplifier when lower than a certain value). Moreover this can be done independently for each sensing volume.

Determining the Position of an Object in Space

FIGS. 8 to 18 illustrate in detail how a device according to an embodiment of the invention can be used to determine the position of an object in three dimensions.

According to a particular embodiment, a light illumination spatial encoding pattern 100 is formed with local maxima 102 located, for example, on a 1 cm² matrix along the x and y axis of a reference plane, such as surface 5 shown in FIG. 1. Local minima could of course equivalently be used. In the embodiment the locations of the local minima/maxima are used as reference locations. Here, each of these reference locations is 1 mm in diameter. It will be appreciated that, if the light emitters of the light emitting means 2 project a local maximum/minimum in a direction perpendicular to the plane in which they are mounted all local maxima/minima extend in parallel away from the mounting plane. Consequently in this arrangement distance of local minima/maxima from each other is constant at any given distance from the light sources. The relative location of the local maxima/minima is stored in reference memory 117. Local maximum 102 is the centre of a circle 104 wherein the circle describes the half intensity profile of the light emitter. The light intensity at the circumference of this circle is half that of the local maximum 102.

In the above discussed example the absolute position the local maxima/minima occupy in the x-y plane does not change with distance from the emitters. However, in other embodiments the positions of the local maxima/minima in the x-y plane can change with changing distance from the emitters. Given that the intensity profiles created by the emitters as well as their arrangement relative to each other is known, the coordinates of the reference points, dependent upon the distance z from the emitters, is stored in the reference memory 117.

As noted above, preferably LEDs 108 are employed to generate the light illumination spatial encoding patterns. Here, the LEDs are infrared-based and emit with a 5° light intensity angle around the centre of each LED. However, other directional light sources with or without filters can be used to construct the light intensity spatial encoding pattern shape shown in FIGS. 8 and 9.

The LEDs may emit in sequence, i.e. can be turned on and off for a short period of time, for example between one and two micro-seconds (or less). Such an emission improves the safety of the apparatus as it lowers the emission of infrared light when used, but also reduces its energy consumption.

Figure 8:
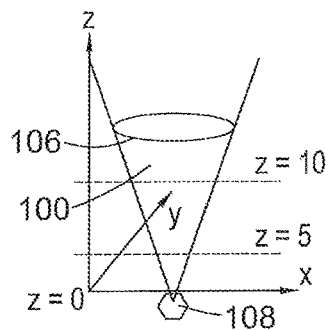
FIG. 8 is a graphical representation of a light illumination volume according a particular embodiment of the invention.
Figure 9:
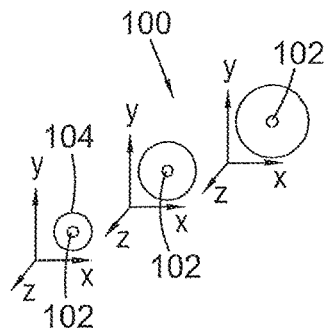
FIG. 9 is a graphical representation of the light illumination spatial encoding patterns corresponding to the light illumination volume of FIG. 8 at different positions on the z-axis.

The volume of the cone of FIGS. 8 and 9 can be approximated to that of a cylinder, as the opening angle of the cone is small. Hence, while the size of the local maximum increases along the z axis as seen in FIG. 9, the charge of the light distribution can be approximated as being the same on each plane (x,y).

In one embodiment sensors (not shown in FIGS. 8 to 18) are located near each local maximum/local minimum much like the sensors 7 in FIG. 1. The sensors detect light and obtain an output signal value. It will be appreciated that the sensors do, however, not have to be located close to the emitters. Instead the sensors can be placed elsewhere, as long as they are able to detect emitted light modulated by an object in a sensing volume the sensor is required to observe.

Figure 10:
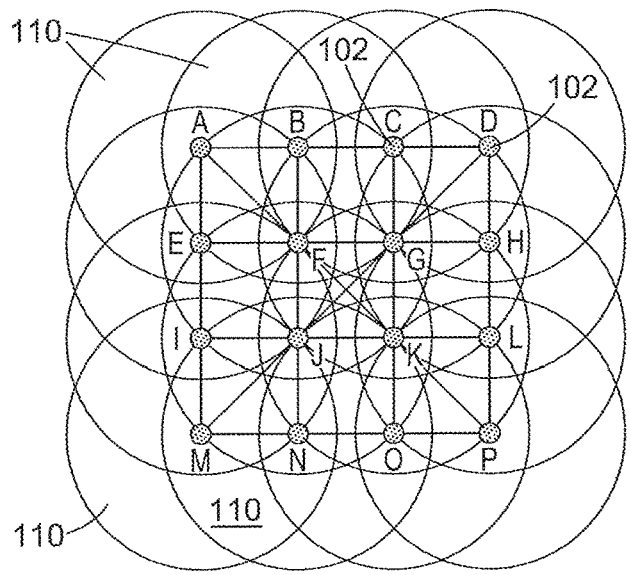
FIG. 10 is a graphical representation of light illumination spatial encoding patterns comprising an overlapping zone and their corresponding reference locations according to a particular embodiment of the invention.
Figure 11:
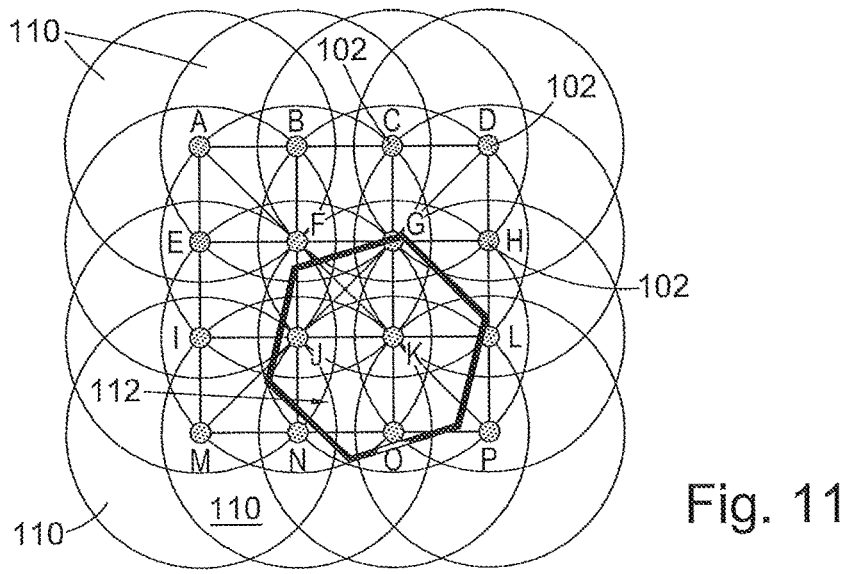
FIG. 11 is a graphical representation of an object present within the overlapping zone of the superimposed light illumination spatial encoding patterns of FIG. 10.
Figure 12:
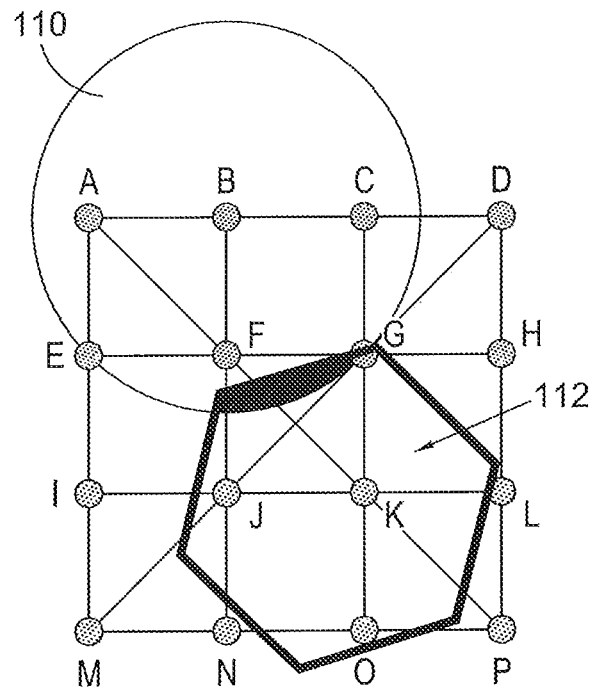
FIG. 12 is a graphical representation of the portion of the surface of the object of FIG. 11 covering one of the light illumination spatial encoding patterns of FIG. 10.
Figure 13:
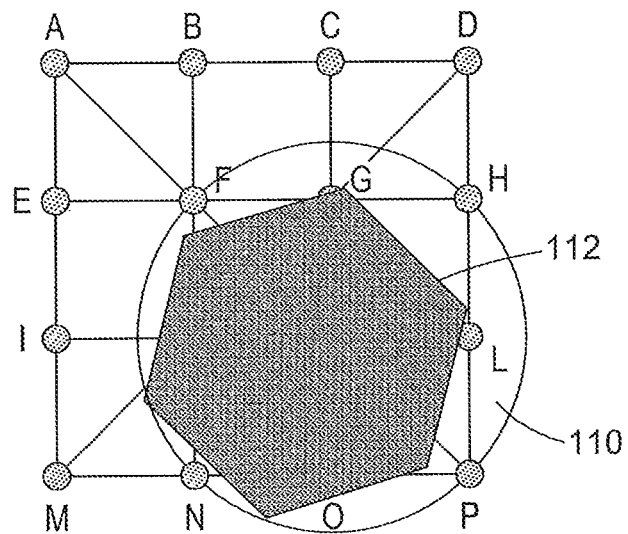
FIG. 13 is a graphical representation of the portion of the surface of the object of FIG. 11 covering another light illumination spatial encoding pattern of FIG. 10.

In a particular example illustrated on FIG. 10, sixteen light illumination spatial encoding patterns 110 (represented in a simplified manner) are emitted from a plane surface on a four by four square. Each light illumination spatial encoding pattern comprises a local maxima/minima that are part of the light illumination spatial encoding patterns are labelled A to P. If, for the plane shown in FIG. 10 Z=0, the (x, y, z) coordinates of the local maxima are as follows:

$$A: \begin{pmatrix} 0 \\ 3 \\ 0 \end{pmatrix} B: \begin{pmatrix} 1 \\ 3 \\ 0 \end{pmatrix} C: \begin{pmatrix} 2 \\ 3 \\ 0 \end{pmatrix} D: \begin{pmatrix} 3 \\ 3 \\ 0 \end{pmatrix}$$

$$E: \begin{pmatrix} 0 \\ 2 \\ 0 \end{pmatrix} F: \begin{pmatrix} 1 \\ 2 \\ 0 \end{pmatrix} G: \begin{pmatrix} 2 \\ 2 \\ 0 \end{pmatrix} H: \begin{pmatrix} 3 \\ 2 \\ 0 \end{pmatrix}$$

$$I: \begin{pmatrix} 0 \\ 1 \\ 0 \end{pmatrix} J: \begin{pmatrix} 1 \\ 1 \\ 0 \end{pmatrix} K: \begin{pmatrix} 2 \\ 1 \\ 0 \end{pmatrix} L: \begin{pmatrix} 3 \\ 1 \\ 0 \end{pmatrix}$$

$$M: \begin{pmatrix} 0 \\ 0 \\ 0 \end{pmatrix} N: \begin{pmatrix} 1 \\ 0 \\ 0 \end{pmatrix} O: \begin{pmatrix} 2 \\ 0 \\ 0 \end{pmatrix} P: \begin{pmatrix} 3 \\ 0 \\ 0 \end{pmatrix}$$

As explained above, each spatial encoding pattern overlaps with its neighbouring patterns. For example, spatial encoding pattern A (the pattern 110 comprising reference location A) overlaps spatial encoding patterns B, F and E. When referring to overlap it is envisaged that the light intensity of a particular spatial encoding pattern is above noise level of the system and may be at least 10%, more preferably 20% or 24% and most preferably 50% of the maximum light intensity of the spatial encoding pattern at the local maximum/local minimum of the other spatial encoding pattern with which it overlaps. In this context, the "other" spatial encoding pattern is an immediately neighbouring pattern such as the spatial encoding pattern surrounding local maxima/minima B and E for the spatial encoding pattern surrounding local maximum/local minimum A in FIG. 10.

Low-Resolution Mode:

The calculation of the position of an object 112 shown in FIGS. 11 to 18 by the signal processing means according to an embodiment of the invention is explained below.

First, said signal processing means, using the outputs of the sensors of the signal obtaining means and the known coordinates (position) of the reference locations A to P, divide the reference locations between three categories:

Reference locations that are located within the object's surface, in the present case locations G, J, K and O;

Reference locations neighbouring to those located within the object's surface, in the present case locations B, C, D, E, F, H, I, L, M and N; and Other reference locations, which are neither located within the objects surface nor neighbouring to those that are. In the present case this corresponds to reference location A.

Obviously more categories can be created for example to detect inner contours of an object using dynamic thresholds according to neighbouring values by looking to a maximum value and lower neighbour values or to find "holes" in an object.

It is recalled that the position of the reference locations in space is known (from the configuration/architecture of the device) and stored in the reference memory 117. The light in each spatial encoding pattern 110 covered by object 112 is reflected by the surface of the object towards the sensors. The intensity of light detected by the sensors depends on the z-axis position of the object and presence in a way that is proportional to the value of light intensity obtained by the sensors (output values) and to the position of the object along the z-axis.

Consequently, for each superimposed spatial encoding pattern 110, the sensors will give an output light signal value proportional to the inverse of the square of the length of the light path, and to the fraction of the spatial encoding pattern 110 falling on the object. As a result, sensors of the signal obtaining means will receive values of light intensity signals from each reference location that is proportional to the portion of the surface object 112 is covering.

In the present example, object 112 is covering a portion of all sixteen spatial encoding patterns but spatial encoding pattern A. For example, as respectively highlighted on FIGS. 12 and 13, object 112 covers a portion of spatial encoding pattern B and a portion of spatial encoding pattern K.

Figure 14:
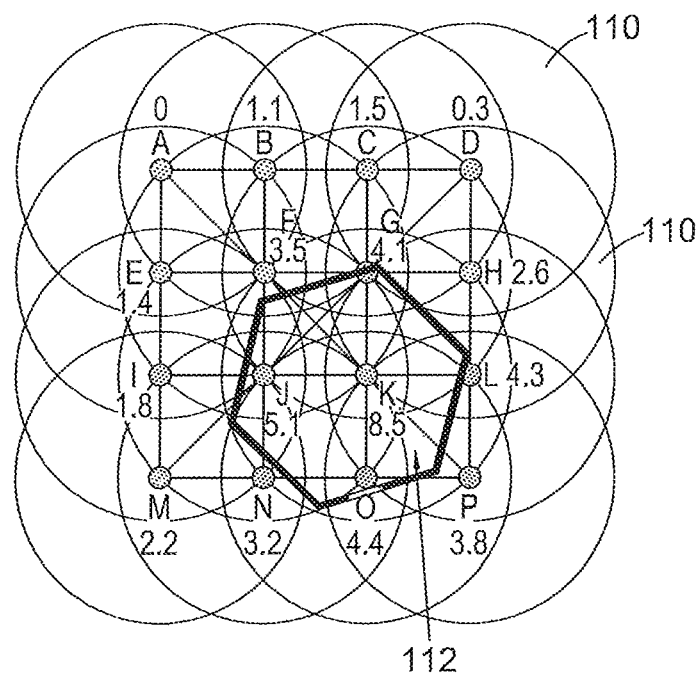
FIG. 14 shows values of light signal emitted by each reference location of FIG. 10 as altered by the presence of the object of FIG. 11.

FIG. 14 illustrates an example of the values of light signal intensity of the individual spatial encoding pattern A-P falling onto the object 113 (in arbitrary unit): 0 for A, 1.1 for B, 1.5 for C, 0.3 for D, 1.4 for E, 3.5 for F, 4.1 for G, 2.6 for H, 1.8 for I, 5.1 for J, 8.5 for K, 4.3 for L, 2.2 for M, 3.2 for N, 4.4 for O and 3.8 for P. Whilst the units used are arbitrary it will be appreciated that, for a planar object parallel to the x-y plane and having a uniform reflection coefficient, the values are proportional to an output of a sensor created for the individual spatial encoding pattern.

The values represented here are comprised between 0 and 10, a value of 0 corresponding to a reference location for which no portion of the surface of the associated spatial encoding pattern is covered by the object and a value of 10 corresponding to a reference location for which the whole surface of the associated spatial encoding pattern is covered by the object. In other words, the light signal values are a proportion of the surface of the light illumination spatial encoding pattern that is covered by object 112.

In one embodiment the signal processing means can function according to three different modes: low-resolution, medium-resolution and high-resolution, that can be used depending on the desired precision for shape recognition in the (x,y) plane.

The advantage of the low-resolution mode lies in the fact that it requires few computing resources. It is also faster to a certain extent. This mode is therefore particularly advantageous in applications where a fast recognition of the presence of the object in a particular zone is needed rather than its exact position within that zone, for example fast impact prediction.

Its principle lies in the use of value thresholds to determine the presence of the object within a particular light spatial encoding pattern. Considering a working range comprised between a minimum value 0 (above system noise floor) and a maximum value 10 (below system saturation) the low value threshold would be usually equal or superior to the minimum possible value and inferior to the maximum possible value. As such, should the light signal value perceived by the sensors from a sensing volume be lower than a first predetermined threshold, or low threshold, then the object will be considered to be absent from the space occupied by the light illumination spatial encoding pattern associated with the reference location.

Conversely, should the light signal value perceived by the sensors from a sensing volume be higher than the low threshold then the sensing volume's reference location will be considered as within the surface of the object. A second threshold that is higher than the low threshold may also be used. If a signal level received is higher than this second threshold, then the object may be closer to the sensors than desired/permitted by a defined sensing range and no computation is performed using the so acquired signals. It is also envisaged that in one embodiment no received signal is used for further computation if one of the received signals exceeds this second threshold.

It is also envisaged that, should the value of the light signal obtained from the neighbouring reference locations be higher than the low threshold, then the whole surface of the light illumination spatial encoding pattern will be considered as fully inside the surface of the object. Should one or more but not all values of the light signal obtained from the neighbouring reference locations be lower than the low threshold, the sensing volume will be considered as only partially filled with a surface of the object, i.e. as comprising an edge of the object, sensing volumes of this nature are referred to as first category volumes herein below.

In the case of FIG. 14, considering a low threshold of 4, reference locations G (4.1), J (5.1), K (8.5), L (4.3) and O (4.4) are considered as within the surface of the object. As reference location K is surrounded by reference locations that are above the low threshold, K is considered as inside the object, Reference G, J, L and O are categorised as first category locations.

Figure 15:
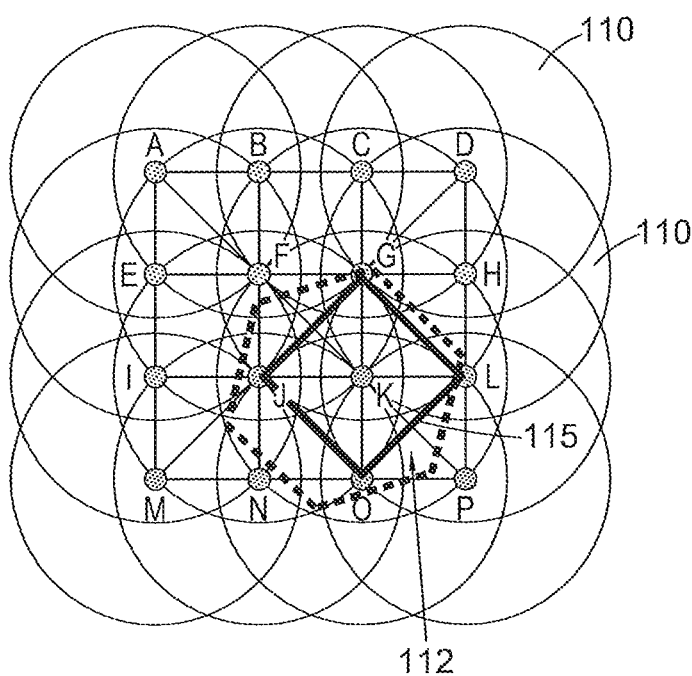
FIG. 15 is a graphical representation of the shape of the object of FIG. 11 as calculated by a device according to the invention in low resolution mode.

The resulting low-resolution calculated shape 115 of the object is illustrated on FIG. 15 by solid lines (the shape of the object is indicated as a dashed line). Said low-resolution calculated shape 115 is obtained by joining first category locations together. Hence, first category locations constitute the corner points or vertexes of the low-resolution calculated shape 115 of the object. In the present example, low-resolution calculated shape 115 is a square. Naturally, low-resolution calculated shape 115 will tend to increase in complexity along with the number of reference locations. Thus, higher precision can be attained by increasing this number, or using the medium-resolution mode which will now be described. Values in this example are proportional to the proximity of the object at least for locations within the object as integral spatially encoding patterns are sensed in these locations. Values can therefore be used as high resolution Z values. Time consecutive sensing values can allow high resolution high accuracy and high speed Z velocity monitoring in the low resolution mode and permit additional categorization of the locations with velocity value thresholds.

Medium Resolution Mode:

The medium-resolution mode is a compromise between computation costs, speed and precision. To implement this mode, signal processing means perform the same calculations as in the low-resolution mode, which serve as a basis. The signal processing means will thus first identify the first category locations, or G, J, L and O in the example described above. Then, the centre of mass or weighted position coordinates (weighted by the light signal value of each location) of a matrix centred on said first category locations is calculated for each first category location. The resulting points are closer to the real edge of the object and will be called second category points herein below.

In the present example, first category location G is the centre of a first matrix:

$$\begin{bmatrix} B & C & D \\ F & G & H \\ J & K & L \end{bmatrix}$$

first category location J is the center of a second matrix:

$$\begin{bmatrix} E & F & G \\ I & J & K \\ M & N & O \end{bmatrix}$$

first category location O is the center of a third matrix:

$$\begin{bmatrix} J & K & L \\ N & O & P \\ 0 & 0 & 0 \end{bmatrix}$$

And first category location and L is the center of a fourth matrix:

$$\begin{bmatrix} G & H & 0 \\ K & L & 0 \\ O & P & 0 \end{bmatrix}$$

To obtain the coordinates $(x_{cog}, y_{cog})$ of the centre of mass or weighted position coordinates of each of these matrixes, the following formula is used:

$$\begin{pmatrix} x_{cog} \\ y_{cog} \end{pmatrix} = \frac{1}{(V_1 + V_2 + \ldots + V_n)} \times \begin{bmatrix} V_1 x_1 + V_2 x_2 + \ldots + V_n x_n \\ V_1 y_1 + V_2 y_2 + \ldots + V_n y_n \end{bmatrix}$$

where $V_1, V_2 \ldots V_n$ are the values of the light signal corresponding to 1 ... n locations of the matrix and $(x_1, y_1)$, $(x_2, y_2) \ldots (x_n, y_n)$ are the coordinates of said locations. In the embodiment illustrated in FIG. 14, n is equal to 9. In our example, we called G2, J2, O2, L2 the centre of mass or weighted position coordinates of these 4 matrixes, called as well second category locations.

Hence, in the present example, four second category locations are obtained using the following calculation:

$$\begin{pmatrix} x_{G_2} \\ y_{G_2} \end{pmatrix} = \frac{\begin{bmatrix} V_B x_B + V_C x_C + V_D x_D + V_F x_F + \\ V_G x_G + V_H x_H + V_J x_J + V_K x_K + V_L x_L \\ V_B y_B + V_C y_C + V_D y_D + V_F y_F + \\ V_G y_G + V_H y_H + V_J y_J + V_K y_K + V_L y_L \end{bmatrix}}{(V_B + V_C + V_D + V_F + V_G + V_H + V_J + V_K + V_L)}$$

$$\begin{pmatrix} x_{G_2} \\ y_{G_2} \end{pmatrix} = \times \begin{bmatrix} 1.1 \times 1 + 1.5 \times 2 + 0.3 \times 3 + 3.5 \times 1 + 4.1 \times 2 + 2.6 \times 3 + \\ 5.1 \times 1 + 8.5 \times 2 + 4.3 \times 3 + 3.2 \times 1 + 4.4 \times 2 + 3.8 \times 3 \\ 1.1 \times 3 + 1.5 \times 3 + 0.3 \times 3 + 3.5 \times 2 + 4.1 \times 2 + 2.6 \times 2 + \\ 5.1 \times 1 + 8.5 \times 1 + 4.3 \times 1 + 3.2 \times 0 + 4.4 \times 0 + 3.8 \times 0 \\ \hline (1.1 + 1.5 + 0.3 + 3.5 + 4.1 + \\ 2.6 + 5.1 + 8.5 + 4.3 + 3.2 + 4.4 + 3.8) \end{bmatrix}$$

$$\begin{pmatrix} x_{G_2} \\ y_{G_2} \end{pmatrix} = \begin{bmatrix} 1.95 \\ 1.91 \end{bmatrix}$$

A similar calculation gives the following coordinates for the remaining second category locations:

$$\begin{pmatrix} x_{J_2} \\ y_{J_2} \end{pmatrix} = \begin{pmatrix} 0.95 \\ 1.34 \end{pmatrix}$$

$$\begin{pmatrix} x_{O_2} \\ y_{O_2} \end{pmatrix} = \begin{pmatrix} 2.4 \\ 0.1 \end{pmatrix}$$

$$\begin{pmatrix} x_{L_2} \\ y_{L_2} \end{pmatrix} = \begin{pmatrix} 2.95 \\ 1.04 \end{pmatrix}$$

Figure 16:
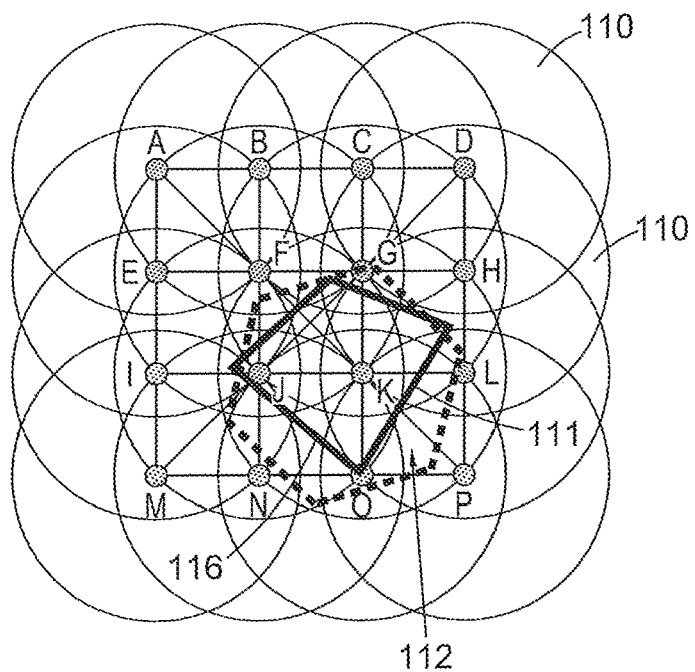
FIG. 16 is a graphical representation of the shape of the object of FIG. 11 as calculated by a device according to the invention in medium resolution mode.

The resulting medium-resolution calculated shape 116 of the object is illustrated on FIG. 16. The original shape is again shown in dashed lines, whilst the calculated medium resolution shape is shown in bold lines.

Said medium-resolution calculated shape 116 is obtained by joining second category locations 116a together. Hence, second category locations 116a constitute the corner points or vertexes of the medium-resolution calculated shape 116 of the object. Here, medium-resolution calculated shape 116 is a four-sided polygon that is closer to the real shape of object 112 compared to low-resolution calculated shape 115. These second category locations can give very good object centre estimation. Values in this example are proportional to the proximity of the object at least for locations within the object as integral spatially encoding patterns are sensed in these locations. Values can therefore be used as high resolution Z values and mapped to neighbour second category locations or averaged to give three dimensional object centre estimation. Time consecutive sensing values can allow high-resolution high accuracy and high speed Z velocity monitoring in the medium resolution mode and permit additional categorization of the second category locations and derivatives with velocity value thresholds.

High Resolution Mode:

A high-resolution mode is described in the following. This mode is particularly adapted to high-precision requirements. To implement this mode, signal processing means perform the same calculations as in the low-resolution mode. The medium-resolution mode is a good averaging of individual locations calculated in the high resolution mode.

Both medium-resolution and low-resolution calculations can serve as a basis of the calculations performed in the high resolution mode, depending on the required precision or task to perform. They may be chosen on the fly. Therefore, signal processing means use first category locations as a basis.

In this mode a series of new points is calculated to replace the previously calculated first category locations in order to increase the number of vertexes of the high-resolution calculated shape. These new points, or third category locations, are, for each first category locations, the respective centres of mass or weighted position coordinates (weighted by their light intensity signal value) between said first locations and the neighbouring reference locations to those considered as within the object.

In the following example, first category locations G, J, L and O are used as a basis for the high-resolution mode calculation. The third category locations associated with first category locations G are the respective five centres of centre of mass or weighted position coordinates between first category locations G and neighbouring locations B, C, D and F and H, neighbouring locations J, K and L being previously considered as within the object.

In a similar manner, the third category locations associated with first category locations J are the respective five centres of mass or weighted position coordinates between first category locations J and neighbouring locations E, F, I, M and N, neighbouring locations G, K and O being previously considered as within the object.

The third category locations associated with first category locations L are the respective two centres of centre of mass or weighted position coordinates between first category locations L and neighbouring locations H and P, neighbouring locations G, K and O being previously considered as within the object.

Finally, the third category locations associated with first category locations O are the respective two centres of mass or weighted position coordinates between first category locations O and neighbouring locations N and P, neighbouring locations J, K and L being previously considered as within the object.

The formula used for calculating the third category locations is the following:

$$\begin{bmatrix} x \\ y \end{bmatrix} = \frac{1}{(V_1 + V_2)} \begin{bmatrix} x_1 V_1 + x_2 V_2 \\ y_1 V_1 + y_2 V_2 \end{bmatrix}$$

where $(x_1, y_1)$ and $(x_2, y_2)$ are the coordinates of the couple of considered points (first or second category locations and neighbouring location that is not within the object) and $V_1$ and $V_2$ the associated light intensity signal values.

For example, third category locations point $G_F$, that is the centre of mass or weighted position coordinates between first category locations G and neighbouring reference location F has the following coordinates $(x_{GF}, y_{GF})$:

$$x_{GF} = \frac{x_F V_F + x_G V_G}{V_F + V_G}$$

$$y_{GF} = \frac{y_F V_F + y_G V_G}{V_F + V_G}$$

Using the values cited previously:

$$x_{GF} = \frac{1 \times 3.5 + 2 \times 4.1}{3.5 + 4.1}$$

$$x_{GF} = 1.54$$

$$y_{GF} = \frac{2 \times 3.5 + 2 \times 4.1}{3.5 + 4.1}$$

$$y_{GF} = 2$$

Figure 17:
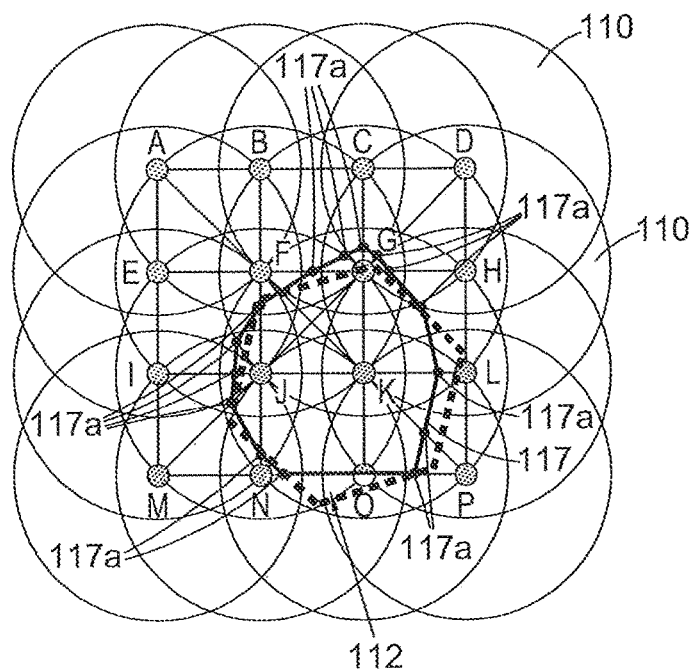
FIG. 17 is a graphical representation of the shape of the object of FIG. 11 as calculated by a device according to the invention in high-resolution mode.
Figure 18:
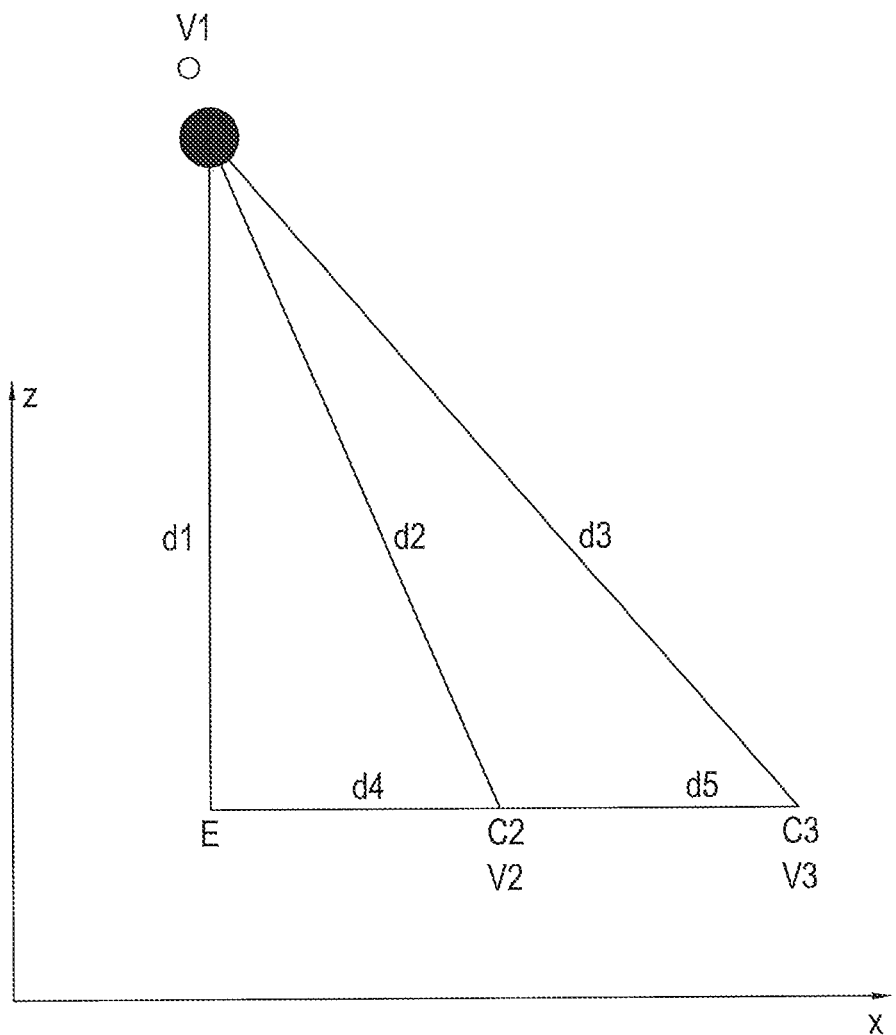
FIG. 18 is a sketch of an emitter, a reference location and two sensors according to a particular embodiment of the invention.

The resulting high-resolution calculated shape 117 of the object is illustrated on FIG. 17.

Said high-resolution calculated shape 117 is obtained by joining third category locations 117a together. Hence, third category locations constitute the corner points or vertexes of the calculated shape of the object. The high-resolution calculated shape 117 is a fourteen-sided polygon that is closer to the real shape of object 112 compared to low-resolution calculated shape 115 and medium-resolution calculated shape 116.

The sensing arrangements and associated methods aforementioned can be done in several dimensions to calculate high-resolution three-dimensional measurements, although in most embodiments economy of means can be realized for other acceptable techniques permit z position calculations.

The distance between a point on the object and a sensor in the z-direction can be estimated using: (i) inverse square law, (ii) calibration; or (iii) triangulation. The distance of the point from the sensors can be determined either before or after the above described calculations of weighted averages. As the calculation of weighted averages relates sensor outputs for different sensing volumes to each other the distance an object has from the sensors does not have a significant impact on the calculation of weighted averages.

The inverse square law stipulates that the position of a point along the z axis is defined by the distance affecting the quantity of light received from the sensor and the one emitted by the LED.

For the present embodiment's purposes, the inverse square law can be normalized and simplified by assuming that:

$$V_G = \frac{1}{Z_G^2}$$

$$Z_G = \sqrt{V_G}$$

where $V_G$ is the amount of light received by the sensor G and $Z_G$ the distance of the light path between sensor and emitter so the double the distance of a reflecting point located above emitter G. The reflectance is a constant that can be ignored here for simplifying calculations and the inverse square law is used to linearize the values. Linearity of the values correlated with distance is also function of the sensing system response curve and the inverse square curve can be modified or compensated in many ways (e.g. using linear or logarithmic amplifiers for example).

Calibration is based on the difference of light signal received by the sensors. As the light signal is directly related to the distance to the sensor, a calibration curve giving the position of each point on the z axis for each value of light signal received can be established. This curve, or values representing it, can be stored in the reference memory 117. Surprisingly it was found that the reflectivity of most opaque objects has comparatively little influence on the required calibration or simply can be calibrated for a preferred and contextual usage of the device.

Alternatively or in complement, the minimal signal value $V_{min}$ for a distance $Z_{max}$, and the maximal signal value $V_{max}$ for a distance on the z axis $Z_{min}$ can be defined by applying the inverse square law described above or effectively measured. $Z_{max}$ and $Z_{min}$ may be stored with $V_{min}$ and $V_{max}$ as reference values. Once these two couples of values are obtained, a linear function linking the linearized light intensity value V and the distance Z on the z axis can be established according to the following formula:

$$Z = \left( \frac{Z_{max} - Z_{min}}{V_{max} - V_{min}} \right) \times V$$

A further embodiment uses triangulation. Triangulation allows obtaining a more precise value of the height (Z value) of an object located above an emitter by taking into account the amount of light received by two sensors located near the emitter. In the example shown on FIG. 18 the height of an object O above the sensors is called $d_1$. An example of such a method includes defining the distance $d_1$ on the z-axis of a point O located perpendicularly above an emitter E and two sensors named $C_2$ and $C_3$.

E emits a certain light spatial encoding pattern, and the object O reflects a light signal the intensity value $V_1$ of which is received by the receiver and thus known. In a similar manner, $C_2$ and $C_3$ receive light signals of respective intensity values $V_2$ and $V_3$, which depend on the portions of their respective spatial encoding patterns that are covered by the object O. $V_2$ and $V_3$ are thus known. Finally, the distances between O, E, $C_2$ and $C_3$ respectively $d_1$, $d_2$, and $d_3$, are known from their original positioning in the overall device, as stored in the reference memory 117.

The distance $d_1$ can be calculated using the following formulae, which are derived from the inverse square law of light mentioned above and the Pythagoras theorem.

We note $d_6=d_4+d_5$.

$$V_2 = \frac{V_1}{d_2^2}$$

$$V_3 = \frac{V_1}{d_3^2}$$

$$\frac{V_3}{V_2} = \frac{d_2^2}{d_3^2} \text{ so}$$

$$d_3^2 = \frac{V_2 d_2^2}{V_3}$$

$$d_1^2 + d_4^2 = d_2^2$$

$$d_1^2 + d_6^2 = d_3^2$$

$$d_1^2 = d_3^2 - d_6^2$$

$$d_1^2 = \frac{V_2 d_2^2}{V_3} - d_6^2$$

$$\frac{V_3}{V_2} = \frac{d_1^2 + d_4^2}{d_1^2 + d_6^2}$$

$$d_1^2 = \frac{V_2 d_4^2 - V_3 d_6^2}{V_3 - V_2}$$

$$d_1 = \sqrt{\frac{V_2 d_4^2 - V_3 d_6^2}{V_3 - V_2}}$$

The knowledge of the contour of an object as projected onto the (x,y) plane and the positions reference points on the object occupy along the z axis allows defining the shape in three dimensions of any object positioned above the apparatus.

In embodiments in which the minimum distance between an object and the sensors is defined by a physical surface that prevents the object from moving closer to the sensors it is also envisaged that the device keeps track of the maximum light intensity received at any of the sensors and from any of the sensing volumes. It is known that the maximum light intensity is received when the object touches the physical surface. By detecting a maximum signal intensity the device consequently detects the maximum signal intensity achievable for the object. By comparing this maximum signal intensity to the maximum signal intensity of a white object (which may, for example, be stored in the reference memory 117 shown in FIG. 19) the calculated distance of the object can be corrected for a light reflectivity of the object that differs from the reflectivity of a white object. The calculated distance of the object can be corrected for a light reflectivity of the object that differs from the reflectivity of a white object.

It will be appreciated that the speed of an object can be determined in either of the above described low, medium and high resolution sensing modes by detecting the position of the object or of a point on the object at least twice at different points in time and by calculating the speed of the object by dividing a detected distance travelled by the object or the point of the object over the observed time period. It is also envisaged that the point on the object is not a specific physical point but is instead a virtual point defined on the object based on a property of the object. The point can, for example, be an estimated centre of mass/gravity of the object.

Determining a Distance of an Object from Sensors/Emitters

Variation of light intensity along a third dimension Z can also be artificially produced in the same way described above with reference to the XY plane, e.g. using similar spatial encoding patterns generated in a 3rd dimension. This can be achieved by encoding light intensity pattern spatially in three dimensions (e.g. for example using two or more intersecting two-dimensional light encoded sensing volumes projected at different angles) and/or sensing in a given volume through three dimensional encoding (e.g. for example sensing through two-dimensional spatial encoding pattern filters from at least two different angles). It is especially useful when using coherent light source that have little intensity variation over distance.

It is also possible to facilitate depth sensing by limiting the field of view of a sensor by placing masks, like a tubular sleeve, or gradient filters around the sensor. In this fashion the amount of light that can reach the sensor is limited by the aperture of the sleeve. Thresholding and/or triangulation can then be used to provide a more accurate indication of the distance and alignment of an object from the sensor. Moreover many solutions can be used for estimating Z or proximity while using spatial encoding patterns for X and Y, including photon counting for long distances, so the invention is benefitting very flexible implementations at a distance and from a single surface.

Figure 20:
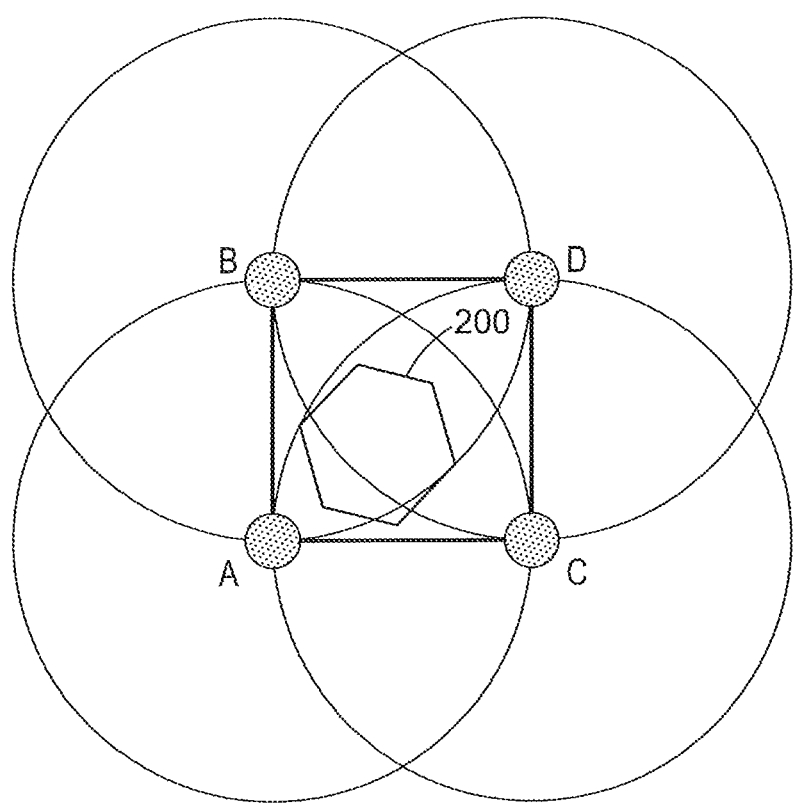
FIG. 20 shows an embodiment in which an object to be sensed is smaller than the spacing between reference locations.

FIG. 20 shows an embodiment in which the object 200 being sensed is smaller than the spacing between the reference locations A to D. In this embodiment a different mode of calculation is used for estimating the position of the object. A and B are the reference locations of two overlapping light emission spatial encoding patterns. Objects or object features can sometimes be of a smaller size than the distance between A and B. In this case, a simple centre of mass or weighted position coordinates calculation between two or more overlapping spatial encoding patterns sensed values is calculated to estimate the object or part of the object's position (at least in the dimensions of the patterns, e.g. X,Y). In practice a small object is determined to be present when there is no sensing volume that is determined to lie wholly within the object (so that only sensing volumes comprising "edges" are detected in a group).

If the inverse square law is used to calculate distance of a small object from sensors in one of the dimensions, distance can be estimated with one of the following methods:

By summing the values of the light intensity sensed as having been reflected by the object 200 for two or more overlapping spatial encoding patterns. In this fashion the distance of the small object from the sensor can be estimated even though the object does not occupy an entire sensing volume, so that a determination of whether a low level of received light is due to a large distance of the object from the sensor or due to the fact that only a fraction of a sensing volume is occupied by the object.

- By calibrating the system using an example object that is to be sensed and compensate the sensed value with an average correction ratio or curve or look up table stored in the memory 117 on the basis of this calibration.
- By identifying a detected shape as one of a number of typical shapes (such as identified objects or hand gestures, for example) and, based on stored information relating to the identified typical shape, associate surface and/or material properties with the identified shape to compensate the sensed value with a related correction ratio or curve or look up table based on the surface and/or material properties the shape has been associated with.
- If the small object falls between points of maximum intensity in the overlap between two sensing volumes but is determined or assumed to be moving then a point in time where the location of the small object coincided with a point of maximum intensity is identified and used to form the basis for detection of the distance of the object from the sensor.
- If the small object is a part of a large object (say a finger or finger tip sensed together with the associated hand) then the distance of the small object can be estimated or determined by detecting a maximum signal intensity originating from the large object (this maximum signal intensity is assumed to originate from a sensing volume wholly filled by the large object) and use the so detected signal value for estimating the distance, say by using the inverse square law.

Scanning in 1 D, 2D and 3D

Whilst the discussion provided above with reference to FIGS. 6 to 17 focussed on arrangements where objects are detected in a 2D plane using overlapping sensing volumes it will be appreciated that the present invention is not limited to such examples.

As suggested by FIG. 1, for example, sensing may also take place along one dimension only, such as in the direction parallel to line 5 shown in FIG. 1. If depth sensing (that is sensing in the paper plane of FIG. 1 orthogonal to line 5) is desired, then such depth sensing can simply be added in one of the above described ways, to provide sensing in a 2D plane orthogonal to the plane occupied by the emitters 2 and receivers 7. It will be appreciated that the spatial encoding of the sensing volumes for 1D sensing merely requires that one property of the spatial encoding within the sensing volumes changes in a common direction, namely the direction in which the sensing is to be performed.

When 2D sensing in the manner discussed above with reference to FIGS. 6 to 17 is to be performed, it is important for the medium accuracy and high accuracy sensing mode that spatial encoding of the sensing volumes allows interpolation along two intersecting lines, preferably in two dimensions, that is along the x- and y-directions used in FIGS. 6 to 17. This means that a property of the sensing volume has to change in both sensing volumes in each direction in which interpolation is to be performed. This does not mean that the same property has to change in both of the directions in which interpolation is to be used or indeed that it is the same property in overlapping sensing volumes that has to change in the direction in which interpolation is to be performed, although in a preferred embodiment the property that changes is the same in all overlapping sensing volumes and along all directions in which interpolation is to be performed. It will be appreciated that this applies to all types of sensing in conformity with preferred embodiments of the present invention, irrespective of how many dimensions are involved in the sensing.

Sensing in the third dimension in the embodiments described above with reference to FIGS. 6 to 17 can be achieved in numerous ways, for example by using the inverse square law. An additional way of achieving 3D sensing that differs from this approach but that can be combined with this approach is to provide a light emitter and/or sensor architecture that generates sensing volumes that do not all extend in the same direction (i.e. along the z-direction in all of FIGS. 6 to 17). If sensing volumes are generated in which spatial encoding is also provided along a third dimension, such as the z-axis, then interpolation is also possible along this third dimension, thus providing for true 3D sensing. As hinted at above, such 'true' 3D sensing can be combined with the above described other ways of determining distance from the sensors, such as the use of the inverse square law.

It is moreover envisaged that 'true' 3D sensing is achieved even in situations in which all sensing volumes extend in the same direction as long as one property of the sensing volume changes between the sensing volumes in the overlapping area so that a difference in the property between the sensing volumes allows interpolation in the third dimension. Multiple sensing volumes with different origins and along multiple axis and directions can be setup to cover a wider sensing volume, to overcome object obstruction or overlapping problems.

Use of Thresholds

As mentioned in various sections above, embodiments can rely on the use of thresholds during processing. A number of these thresholds, each of which can be used in any of the above configurations, are discussed in more detail in the following.

To reduce energy consumption of the device, the device may be operated in a standby mode in which the only check that is performed is whether or not an object is present in the sensing volume of the device. In this mode the device checks if the signal detected by the sensors is above a minimum threshold in arrangements where light emitted by light emitters is expected to be reflected by the object or below a maximum threshold in arrangements in which light emitted by the emitters is blocked or attenuated by an object present in the sensing space. The above mentioned minimum threshold may be just above the noise floor of the system and the above mentioned maximum threshold may be just below the upper end of the dynamic operating range of the system, which in turn may be close to the saturation point of the system.

When operated in the above discussed standby mode the device may additionally or alternatively operate at a frame/sampling rate that is lower than the maximum possible frame/sampling rate it can achieve to reduce power consumption.

For security optimisation of the light emissions in particular while using infrared light, for each light volume the device can adapt the intensity of light emitted to the proximity of sensed objects, intensity can increase with object distance so it maximises distance reach and minimises object exposure to emissions when closer, sensed values are compensated accordingly to the emission intensity modifications.

It is moreover possible to adjust the sensitivity range of the device through thresholding, so that objects beyond a certain distance from the device are not sensed. This is achieved in an embodiment by setting the minimum threshold (for arrangements in which an object in the sensing volume reflects light back to sensors) that is higher than the noise floor of the system. The device is configured to only process signals that have an intensity higher than the minimum threshold. An object therefore has to get closer to the device the higher the minimum threshold is, so that the maximum sensing depth of the device is artificially reduced in this embodiment.

In an embodiment in which an object in the sensing volume reflects light back to sensors the maximum amount of light that can be received at a sensor is received when the object is at the closest possible distance to the sensor. In embodiments in which a space close to the sensors is not to be used for sensing a maximum threshold (which differs from the above mentioned maximum threshold) can be set, signals above which are disregarded and no further processing is undertaken using these signals.

In an embodiment in which an object in the sensing volume blocks light going to the sensors the maximum amount of light that can be received at a sensor is received when the object is not obstructing light at all and minimum light when object is fully obstructing the sensing volume. In this case minimum and maximum thresholds can be used to calibrate the working range of the system and avoid false detections for example.

Figure 21:
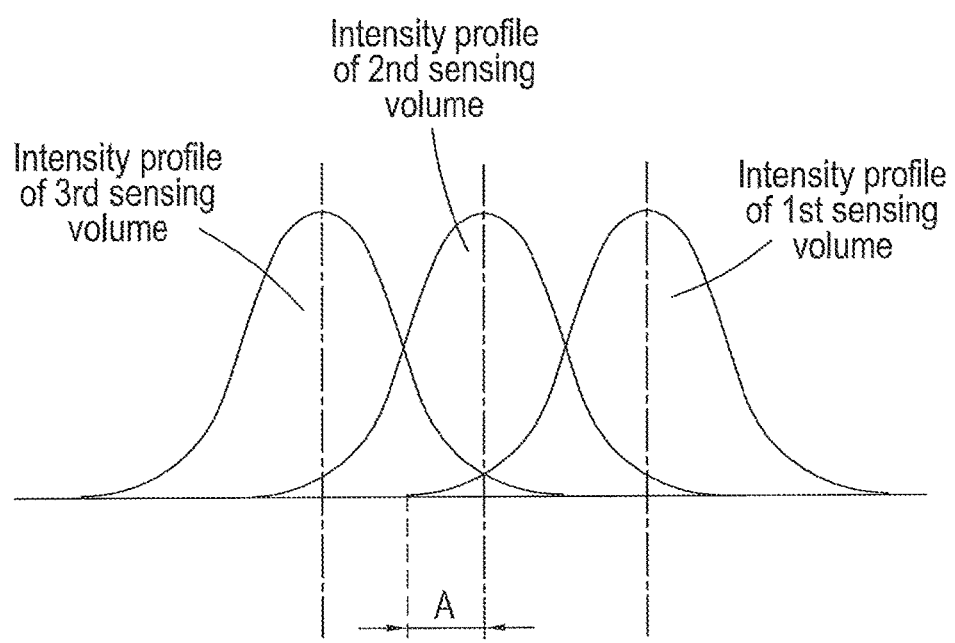
FIG. 21 is a graphical representation of intensity profiles of overlapping sensing volumes.

The operation of the device can also be governed by thresholds involving the signals received from more than one sensing volumes. Interpolation between overlapping sensing volumes, for example, by definition involves the signals of the two overlapping sensing volumes involved. In an ideal situation the overlap between two overlapping sensing volumes is such that each sensing volume is only capable of contributing signals to the centre of the neighbour overlapping sensing volume but not beyond. In reality this is not always the case, however, and situation where the overlap of neighbouring sensing volumes extends further, such as shown in FIG. 21 are not uncommon (and often desired in an attempt to ensure sufficient overlap). In embodiments in which interpolation is performed by determining the ratio between a signal received from a first sensing volume and a signal received from a second sensing volume, the ratio on its own is not indicative of whether or not the coordinate of the interpolation point has moved so far away from the first sensing volume that is has moved beyond the centre of the second sensing volume, as is the case in the area A shown in FIG. 21. Should this be the case then it is inappropriate to continue trying to interpolate using the signals from the first and second sensing volumes. Instead the signals from the second sensing volume should be used for interpolation in combination with the signals from a third sensing volume overlapping the second sensing volume and lying on the side of the second sensing volume opposite to the side at which the second sensing volume overlaps with the first sensing volume, as also shown in FIG. 21. It will be appreciated that, whilst it would of course be possible to simply calculate the interpolated coordinates and determine whether or not they lie in a position that makes calculating these coordinates based on signals received from the first and second sensing volumes inappropriate, this calculation can be avoided if the ratio of the signals used for interpolation is first check to determine whether or not it is above (in situations where the ratio is determined so that the diminishing signal is in the denominator) or below (in situations where the ratio is determined so that the diminishing signal is in the numerator) a predetermined threshold. In one embodiment thresholds of this nature are stored in the reference memory 117 in the form of calibration values, depth dependent calibration curves or LUTs.

In another embodiment interpolation positions associated with particular ratios of signals received from respective first and second sensing volumes can also be stored in reference memory 117, so that, once the ratio has been calculated, a simple look up operation yields the interpolated position. In an embodiment in which two identical light intensity distributions overlap each other a ratio of 1 suggests that equal amounts/areas of the object are present in the two sensing volumes, so that the interpolation point associated with this interpolation is placed centrally between the two centres of the sensing volumes. Relevant calibration values may be generated for a particular architecture of the device and stored in the reference memory 117 during manufacture.

In some embodiments position thresholds for centre and relative signal ratios for overlapping sensing volumes can be measured for calibration and stored in reference memory 117, these thresholds can be linked to shape and objects the categorisation of points and locations. Thresholds can also made dynamic and adapt to formulas depending for example on the size or distance of the object or object feature.

Velocity Thresholds

In one embodiment the device is configured to detect the velocity of an object moving within the sensing area of the device. In an embodiment this is done by calculating a representation of the centre of mass or weighted position coordinates of the object and tracking it over time. Alternative configurations, however, may track over time any feature of the object identified by the device. A predetermined velocity threshold is set in the device in an embodiment and an event or condition is triggered if a detected velocity of an object exceeds the predetermined threshold or falls below the predetermined threshold, as desired. In this fashion objects that pass through the sensing volume of the device at a speed that is too fast or too slow for the object to be an object of interest to a sensing operation for which the device is used can be readily disregarded in further computation.

In the above embodiment a velocity threshold is used as an absolute threshold for deciding whether or not an action should be taken when an object is sensed. It is equally envisaged that more than one velocity threshold is defined/stored in the device, wherein different actions are triggered by different velocities.

It is equally envisaged that a velocity threshold is applied to only a part of a detected object and/or that a second velocity threshold is applied to a second part of the object. In one embodiment a first velocity threshold is associated with the palm velocity of a detected hand, wherein a movement of the finger orthogonal to a plane formed by the palm of the hand that is faster than the first predetermined threshold is interpreted as a finger tapping and may be associated with the activation of a button as is common on computer mice. A coherent movement of the entire hand may be interpreted as a desire of the user to move a cursor on screen as would also be done using a common computer mouse. The device may be configured to only output signals based on this second hand movement if this hand movement is at a speed above a certain threshold, so as to suppress small or slow inadvertent movements. Alternatively or additionally a distance threshold may be set so that small moving distances are filtered out.

The velocity threshold may be set for movements in a particular direction, say along the x, y or z axis of the coordinate system shown in FIG. 8 or any direction defined or definable within this coordinate system.

Thresholds may also be defined so that only movements in a particular direction/at a particular angle relative to a defined direction, such as one of the x, y or z axis of FIG. 8 or a direction defined within the coordinate system defined by these axes, or within a predetermined angular range centred on this direction are detected or used to trigger an associated event.

Additionally or alternatively a threshold may be set for triggering events or behaviours when a change in velocity or direction of movement exceeding the threshold occurs. This may include an increase or decrease in the velocity of the movement, a change in the direction of movement up to and including an inversion of the polarity/direction of the movement. Such a polarity inversion can, for example, be used to monitor finger movement, wherein the point in time at which the finger changes movement direction is identified as the point in time at which a button or key is pressed. This can be used for applications requiring accurate timing, such as the emulation of virtual piano, where key strokes are to be accurately detected or for drum and percussion stroke detection.

Size and Shape Thresholds

The device can calculate the size of an object or any object feature using for example edge point coordinates. Thresholds can be set to further categorise objects and object features by size and dimensions triggering according controls. These size thresholds combined with velocity thresholds can create further thresholding options to isolate moving objects or features and trigger controls depending and the size of a moving element. Size or thickness thresholds can be used to categorise and locate tips of a finger or other noticeable shape features of an object.

The device can also detect the shape of an object by comparing sensed values with stored values, acceptance thresholds can be set when evaluating the percentage of similarities with a stored shape.

Deformation Thresholds

As the device can detect the shape of an object it is also able to observe a change in the object shape over time. A threshold can be associated with such deformation and, should a predetermined deformation threshold be met an event can be triggered or a behaviour can be started. The difference of size of the detected area sensed by the device over time can trigger an event or behaviour if the ratio change in detected surface area exceeds a predetermined threshold. Additionally or alternatively the shape of the object may be determined or tracked and its dimension along predetermined axes be determined or tracked. The device activates an event or behaviour if a change in the shape and/or dimensions exceeds a predetermined threshold.

Defining Virtual Boundaries

The use of minimum and/or maximum thresholds to define an active operating range of the system has been discussed above. It will be appreciated that the boundaries of this active operating range can be considered virtual limits of the operating range. In the above discussed embodiment the present invention simply does not take any action if and when an object is located outside of these boundaries. It will be appreciated that such virtual boundaries can be arbitrarily defined, depending, for example, on the operating requirements of the device. The active operating range of the device extending between the closest point at which an object can reliably be sensed (for example everywhere where there is (still) detectable overlap between sensing volumes) and the point at which an object can still reliably be sensed that is farthest away from the sensors is in one embodiment divided into two or more planes stacked with distance from the sensors, wherein the presence of an object in different ones of these planes is interpreted by the device as an indication received from the user of the device that different actions are intended to be performed or different behaviours are intended to be invoked. For example, in a device in which a touch surface is provided above the sensors, the presence of an object in a plane closest to this surface may be interpreted as the surface being touched. In one embodiment such touch can be interpreted as a drum skin hit emulation for controlling a virtual percussion instrument. The presence of an object in a plane further away from the surface can be interpreted in a different fashion, say as changing the properties or settings of an apparatus controlled by the device. The presence of an object in a particular plane can be determined based on thresholds, in the same manner in which the minimum/maximum thresholds are used to define an operating range.

In short, virtual planes or surface can be defined in embodiments of the invention. Actions taking place in these surfaces or planes are interpreted differently in an embodiment. These planes or surface may also be considered zones that have different functionality.

Such planes, surfaces or zones can of course be defined in any desired shape in the sensing volume of the device. Planes, surfaces or zones do, for example, not have to be parallel to a plane holding the sensors or emitters and can instead also be perpendicular to any such surface (say to divide the sensing space above the surface into two halves, each of which has a different function) or indeed extend at any angle relative to a horizontal or vertical plane.

Any such zone can moreover have any desired shape, be that 1D, 2D or 3D. It is, for example, envisaged that the device may perform specific functions only if an object is present in a predetermined 3D part of the sensing volume. This can, for example, be useful in security related applications for example in robotics where the presence of a hand or body part in a particular part of 3D space is not desired or is deemed dangerous. The presence of the hand in the restricted space can lead to the activation of an alarm or change the movement of a robot or machine to avoid collision. 3D zones surrounding the restricted space may be configured to trigger the sounding of a warning or of progressively warnings if progressive zones are used.

In a different embodiment different zones in 3D may be configured to be interpreted by the device such that the behaviour of the device is determined by the presence of an object within a particular zone. Alternatively or additionally the device may of course simply be configured so that output signals provided to a connected host device indicate in which one of the zones the presence of an object has been detected, so that a host application relying on the sensing of the device can act accordingly.

The zones can take any desired shape and may, for example, be a virtual representation of an object, the interaction with which by a real life object in the sensing area is being sensed. The boundaries defining such an object may be stored in the reference memory 117, defining the thresholds used for determining whether or not a sensed real life object interacts with the stored virtual object.

It is moreover envisaged that detected properties of objects are used to trigger an event or condition. A particular event may, for example, be associated with the type, size, shape or surface of a detected object, so that the event or behaviour is only triggered if an object having a predetermined type, size, a predetermined shape or a predetermined surface, position, movement, speed configuration is detected. In this fashion objects that have a type, size, shape or surface configuration that differs from the predetermined type, size, shape or surface configuration do not trigger the event or condition, so that erroneous triggering is avoided and computational resources that would be expended on tasks associated with the triggering are preserved. It is of course also envisaged that a number of different predetermined object types, sizes, shapes and surface conditions are stored, so that a first event or condition is triggered if an object with a first predetermined type, size, shape or surface condition is detected and a second event or condition is triggered if an object with a second predetermined type, size, shape or surface condition is detected. A device may, for example be configured to emulate (or output signals indicative of a desired emulation of) a first musical instrument if the hand of a user is detected and a second musical instrument if a drum stick is detected. In another embodiment the device indicates a range of sound files for outputting dependent upon the type, size, shape or surface configuration of the object detected. In one example a particular range of sound files is selected if the device senses velocity changes showing the presence of a full hand, a second range of sound files is selected if the device senses the presence of fingertips and a third range of sound files is selected if the device senses the presence of the palm of a hand.

It is equally envisaged that the device stores predetermined shapes, recognises the presence or absence of predetermined shapes and outputs signals depending on the detected shape. Virtual boundaries and associated thresholds aforementioned can be purely virtual and even defined with procedural and mathematical functions to define interaction zones with for example virtual 3D objects, while they can also represent the boundaries of existing and real objects, switches or surfaces within the sensing volumes whether or not these objects are actually sensed calibrated or predefined, for example in the case of a transparent surface or display

Processing

It will be appreciated that power requirements increase and achievable frame rates decrease as processing complexity increases. To minimise energy consumption and the amount of computational resources that have to be made available within the system and to maximise the achievable frame rate an embodiment of the invention separates sensing volumes that comprise data useful for further computation from sensing volumes that do not comprise useful data based on processing methods that are computationally less expensive than methods that are to be used on the remaining sensing volumes in later processing.

In one embodiment, as discussed above, the signal intensity generated for each sensing volume is determined and a decision of whether any object that is being sensed occupies the entire sensing volume, only part thereof or no part of the sensing volume is made, thereby separating the sensing volumes into different sensing volume types. Depending on the calculation that is to be performed for a sensed object any desired calculation can then be performed based only on those sensing volume types that are required for the calculation.

In one straightforward example, the edge of an object can be detected in the coarse sensing mode by separating the sensing volumes in the above described manner and by then either identifying in a data output only those sensing volumes that are only partially occupied by the object (that is those sensing volumes that 'look' at an edge of the object) or only provide these sensing volumes as input to an edge tracing algorithm.

Equally, the sensing volumes that do not contribute to the medium density and high interpolation methods described above can be eliminated from the associated more highly computationally complex further processing involved.

When the inverse square law is used to sense the position of an object in the direction orthogonal to the overlap, then the most accurate results are achieved when this distance sensing is performed for a sensing volume that is wholly occupied by the object, as any drop off in signal intensity from a maximum possible signal intensity can then be assumed to be caused by the distance between the object and the sensor and not by only partial presence of the object within the sensing volume. Sensing volumes that are fully occupied by the object can be identified in the above described manner and distance sensing is then based only on the selected sensing volumes, reducing the computational complexity involved.

It is also envisaged that, to detect an object of known shape that is likely to reliably have a predetermined orientation within the sensing volume of the device the order in which the various sensing volumes are investigated is predetermined so that the likelihood that a predetermined reference point on the object is detected as a first point on the object is increased. A processing method using this reference point can then investigate further sensing volumes in the order required by the method and ignore other sensing volumes, thereby increasing sensing speed and reducing computational complexity. To detect a fingertip, for example, the sensing volume with the highest signal value (or, more generally, the sensing volume with the signal value that indicates that the sensed part of the object is closest to the sensor) may be identified as the fingertip and any further computation focussed on this sensing volume and on volumes surrounding it.

By selecting all of the sensing volumes that fall wholly within a sensed object or all of these sensing volumes in combination with sensing volumes only partially occupied by an object and computing a weighted average of the signals received from these sensing volumes the centre of mass or weighted position coordinates of the sensed object can be approximated. This centre of mass may serve as a reference point for tracking the movement of the object.

Edge Detection

In addition to the above described way of detecting the edge of an object it is also envisaged that an array of sensing volumes is considered at any one time. Instead of considering if one or more of the sensing volumes is partially occupied by an object a further edge detection method simply makes a binary decision whether or not an object is present in the individual ones of the sensing volumes within the array. If it is determined that none of the sensing volumes comprises parts of the object, then the entire array is outside of the object. If all sensing volumes comprise parts of the object, then the entire array may be deemed to be within the object (at least in this initial determination phase, with a more precise determination, such as the ones described above as medium and high density interpolation methods, following thereafter). If one or more sensing volumes of the array are deemed to comprise parts of the object whilst one or more other sensing volumes of the array are deemed not to comprise parts of the object then the array may be identified as lying on an edge of the object, thereby providing a coarse but computationally very inexpensive way of detecting object edges. In a practical implementation the array is an array comprising 3×3 sensing or more volumes.

Interaction of the Device with a Host

To further reduce the amount of computation required by a combination of the device and a host or indeed on board by the device itself, the device is configured to send intermediate sensing results to the host or to an application executed by the host and directing the sensing operations of the device. Such intermediate results may comprise any result that provides an initial indication of a type of object sensed or indeed any sensed property of the object, such as size or surface configuration, the approximate position and/or orientation of the object within the sensing volume, a recognised gesture, velocities etc. In this fashion the host/application executed on the host can determine which further data is required for its own purpose. The device is further configured to receive information or a command identifying or comprising an indication of further parameters of the object to be sensed by the device. The device is configured to alter its sensing and/or data output configuration so as to comply with the received information or command. In this fashion a reduced amount of data has to be transmitted from the device to the host. This is particularly advantageous if, as is the case in a preferred embodiment, the link between the device and the host is a wireless (and therefore bandwidth limited) link. This reduction in bandwidth requirement also reduces the amount of computational resources used by the host, as only a reduced, but more relevant data set is being made available by the device.

Additionally, by being selective regarding the further information to be detected/computed by the device the amount of computational resources used by the device is reduced when compared to a scenario in which all possible parameters of the object are sensed and output to the host.

Before interpolation the sensed values are very similar to pixel sensor values even though they contain additional spatial encoding information. These raw values can be used for low-resolution operations, like object, edge detection, position estimation, rough shape recognition or low-resolution processing including image processing if needed. This pre-processing can be an added value to the system for interpolation can be calculated only when necessary. It has the added benefit to be monitored with the naked eye in its raw format. Therefore this inherent multi-resolution sensing is very useful with raw values can free processing from unnecessary calculations or to filter out unwanted objects, or even trigger different methods of refined interpolated calculations, depending for example on the rough size or shape of the object. It is, for example, envisaged that the above described medium or high-resolution processing/interpolation (or indeed any other computationally intensive operation) is only used under certain circumstances. In one embodiment interpolation is only used if an object (detected first using the coarse mode) is within a predetermined distance range (detected as discussed above, say using the above discussed inverse square relationship) of distances from the sensors. This is useful in situations where energy is to be preserved. In this situation the device operates in a low resolution mode (either in the sense that the coarse scanning mode is used and/or in the sense that fewer frames per second are acquired) until an object is within a predetermined sensing range, at which point the movement behaviour of the object (i.e. if the device was used as a security sensor that is intended to detect entry of an object into a dangerous zone) is detected at higher speeds or higher resolution and/or which point the size or shape of the object is determined using a higher resolution mode (say to determine whether or not the object is of a type that is to be investigated at all).

It will moreover be appreciated that the above switch from a low resolution to a higher resolution can be performed in stages, say so that a switch from a coarse detection mode to a medium resolution mode is performed if a first condition (say distance of the object from the sensors or shape of the object) is met and a switch from the medium resolution mode to a high resolution mode is implemented when a second threshold or condition is met.

The device may further be arranged to receive instructions from a host computer regarding which condition should be applied for switching between different operating modes. In this way the device can have the functionality to perform a (large) variety of functions but to only perform those functions that are of interest to the host computer. In this fashion computing resources and energy are preserved and the amount of communication bandwidth for connecting the device to the host is reduced.

Size and/or shape estimations performed in embodiments of the present invention can be in one, two or three dimensions. Once the shape of an object in a plane, i.e. the x-y plane has been determined or estimated, the thus acquired spatial information can be used as basis for calculating the distance of various parts of the object from the device in the z-direction, for example using the inverse square law of light.

Shape recognition may also be implemented in embodiments of the present invention. For this purpose the device may comprise predetermined shapes stored in a non-volatile memory of the device. Once the shape of a sensed object has been determined or estimated the processor of the device can compare the determined shape with a number of stored shapes. If a correspondence between the determined shape and a stored shape is found an output signal indicating the identified shape may be created. It will be appreciated that, in order to match a detected outline with a stored outline it is not always necessary to compare the entire detected outline with the stored outline. Instead a part of the detected outline is, in one embodiment, used for comparison. This is particularly useful if the object extends laterally beyond a field of vision of the device (in which case parts of the determined object outline are simply straight and represent not the real-life outline of the object but instead the edge of the field of vision of the device). It is also to note that shape and feature recognition can be operated at different levels of accuracy and using different resolutions further optimising processing needs.

Instead of or in addition to detecting shapes of man-made objects the present invention, in an embodiment, is also used for comparing a determined outline of a human hand with stored gesture outlines, so that gestures made by the human hand can be identified.

Once an object or gesture has been identified the nature of the object can be used to provide contextual control of the device or of a host device connected to the device. For instance, if used for drumming applications a long and thin object can be associated with a drumstick. This shape discrimination can trigger some specific calculation modes, as described in more detail below.

In a further embodiment, more than one spatial encoding pattern can be used together to form a spatial encoding pattern of a larger scale and therefore offer multi-resolution sensing. The recursive quality of the sensing can be created in different ways, for example by changing dynamically the driving method or light structuring means properties in time (so that, for example, several sensing volumes are, in one mode, combined to form a single larger sensing volume for a coarse detection mode, whereas, in a higher precision scanning mode the individual sensing volumes can, again, be operated independently), or simply mathematically by sending the signals received from different sensing volumes in the manner it would be done in a higher or the highest resolution sensing mode but then adding or averaging sensed values of groups of sensing volumes to generate a single sensed value covering the area covered by the averaged sensing volumes.

The multiple resolution sensing can be triggered at will. A low-resolution set of calculation can speed up the detection process and resolution detail can be calculated only at strategic locations (edge or features of the object for example).

It will be appreciated that any of the above methods can be used as a basis for estimating the size and/or shape of an object in one, two or even three dimensions. The added dimension of time is, due to the affordable high sensing and processing speeds offering a true velocity or even vibration sensing.

A large number of applications for a sensing device capable of such detection/estimation can be envisaged. A device that can estimate or calculate the shape and/or size of device in its proximity can, for example, be used as a new input device for controlling processors. Device according to embodiments of the present invention can, for example, be used to sense the position of a human hand relative to the devices' surface and/or detect movement of the hand in the x-y plane or towards/away from the device. Such movement detection can be used for a large range of purposes, not least to replace the functionality that, at the time of writing of this patent application, is predominantly provided by the common computer mouse. Put in other words, the movement of a human hand relative to the sensing device can be interpreted in the same way sensed movement of the computer mouse is interpreted and put to similar use in standard computing. For this purpose the device of one preferred embodiment comprises an output interface that provides output signals that emulate those provided by a standard computer mouse for easy integration with existing computer systems using existing user skills.

The above said, it will be appreciated that the system of preferred embodiments can sense not only in 2D but also along the z-axis, so that additional information along the third dimension can be derived from the movement of a hand relative to the device, if desired. This may be useful for applications in which highly complex control signals need to be provided to interact with the application. One such application may be the interaction of a user with computer aided design software. It will be appreciated that devices according to preferred embodiment may, at the very least provide a low-strain alternative to a computer mouse. This may be advantageous for applications that require permanent or long time user input. Such applications are known to lead to repetitive strain injuries in users through over use of the computer mouse. Embodiments of the present invention provide a lower strain alternative.

It will be appreciated that, as the devices according to preferred embodiments can not only sense the position of an object relative to the device and changes in this position over time but can also determine the shape of the object the device (or indeed driver software for the device, which may be executed by a process internal to the device or as software installed on a host computer interacting with the device) may be configured to recognise different shapes. This feature alone can be useful for object recognition and machine vision purposes.

Possibly more importantly, however, this feature can be utilised to allow the device to detect a gesture a user's hand adopts. It will be appreciated that, in this way a user is enabled to control a host interacting with the device through the power of simple hand gestures alone.

In addition to using the device simply for object or gesture recognition for its own purpose, it is also envisaged that the device can be configured to recognise different gestures and interpret them to mean that the user wishes to operate in different operating modes. One gesture, say a flat hand, may, for example, be interpreted to mean that any hand movement sensed whilst the hand adopts this gesture is to be communicated to an attached host device as being a highly precise movement, so that a hand movement over a particular distance is translated into a much smaller/more precise movement in an application run on the host computer.

A hand movement performed whilst adopting a different hand gesture, say a fist, may, in contrast be interpreted as meaning that the movement to be detected is more coarse, say a movement that is to be translated one to one into a movement in the application on the host computer or even amplified to result in larger movement in the application on the host computer.

It can equally be envisaged that different hand gestures can be used to provide access to different functionalities of software run on the host computer, say, for example, access to different menus on software run on the host computer.

Devices according to embodiments of the present invention can also be envisaged as input devices for operating machinery. For example devices according to the present invention may be used to sense the hand movement of a machine operator, thereby replacing the function of the commonly used joystick in such machines. As devices according to embodiments of the present invention operate touch free if desired, they may find particular use in highly polluted environments, such as on building sites and/or in other industrial machinery.

Devices according to embodiments of the present invention can also be used to detect standard human hand movements to have the meaning traditionally associated with this movement. If it is detected, for example, that the user presents the flat palm of her or his hand to the device, then this can be detected as providing an emergency stop signal. Such devices may find use in heavy industrial machinery that does require a highly responsive interrupt mechanism, say for example heavy industrial presses that can lead to human injury is not stopped reliably in emergency situations.

As will be appreciated from the above, a large number of applications for the device of preferred embodiments of the present invention exist. The device may comprise, in addition to the components discussed above, for example with reference to FIG. 19, also a component that interprets the shape of the object based on the determined outline of the object. Such a component may be a processor configured to execute executable code that causes the processor to run a gesture recognition routine in which a detected object outline is compared with stored gesture outlines. If a match between a stored gesture outline and a detected object outline is found then the processor outputs a signal indicating to a connected device, such as a host computer, which gesture has been identified. Alternatively or additionally the device may associate an identified gesture with a predetermined command and output the predetermined command to a host-computing device.

The stored gesture outlines may be pre-stored in the device prior to the point of sale of the device. Alternatively the device may be operable in a learning mode in which the user can make desired hand gestures for detection by the device and in which the device then stores the detected outline as being representative of the gesture made by the user in memory. Allowing a particular user to train the device can help to improve gesture recognition accuracy as the stored gesture outline is created using the same hand that later on provides the gesture that is to be detected.

The device is not limited to hand gestures applications and can be used for emulating various devices and interactions as it is fully programmable and capable of recognising multitude of objects including handheld objects. For example the interaction with a surface can be analysed to emulate and control touch screen driven applications. Detection of a handheld object can trigger further controls like for example, a handheld pen can trigger a writing interaction where the trajectory of the tip of the pen is monitored and used to draw or write lines in computer software. Character recognition can be further applied to this trajectory and used for acquisition of drew letters signs or shapes.

Object recognition and position tracking is an ideal feature for this invention to be used in the calibration or self-calibration of machinery actuators and robots. The tool of an industrial robot can be presented to the device so the robot can compensate drift due to repetitive operation.

The device itself can be either static, moving or motion controlled and used as a scanner when moving. The induced movement and orientation of the device over objects, surfaces or in space for example on a moving vehicle or in the form of a handheld scanner can allow accumulation of large point clouds streaming to memory over time to build ultra-high resolution models for scanning, movement analysis or inspection, in effect the device can calculate its own movement and orientation using time difference and/or compare its data with other on-board position and orientation sensors (GPS, Gyroscope, accelerometer).

The device can achieve very high acquisitions speeds that are allowing its use in vibration and acoustic sensing in applications. In particular it uses light and offers unique non-contact optical acoustic microphone sensing and optical multi-dimensional vibration monitoring.

The memory may, for example, be the reference memory 117 shown in FIG. 19. The processor may be the processor 113 shown in FIG. 19. It will, however, be appreciated that this does not necessarily have to be the case and that instead or additionally a further memory and/or processor may be provided.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality.

It will be appreciated that, although in the examples provided with reference to the figures the spatial encoding shown is such that a maximum/minimum intensity or sensitivity value is present along the centre axis of the sensing volume, the present invention is not limited thereto. As discussed above, spatial variations/encoding can be generated in a large number of ways, so that other spatial encoding pattern are achievable by the person skilled in the art. These include gradients along one direction, for example. It is not essential that a reference location is located along the centre axis of the sensing volume. Instead, the reference location can be located in any desired or convenient location within the sensing volume.

The mere fact that different features are recited in mutually different dependent claims does not indicate that a combination of these features cannot be advantageously used.

The invention claimed is:

1. A device for detecting an object, the device comprising two or more at least partially overlapping sensing volumes and configured to:
   illuminate the sensing volumes; and
   generate a sensing signal, individually for each sensing volume by sensing light modulated by any object in the sensing volume;
   wherein spatial encoding is applied to the sensing volumes;
   the device comprising a processor configured to:
   determine the presence of an object in said sensing volumes based on the sensing signals generated for the sensing volumes and on said spatial encoding;
   approximate position, size or shape of the object by treating a predetermined coordinate within each of the sensing volumes within which the presence of the object has been determined as a point on the object;
   use, for sensing volumes, an initial coordinate assigned to the sensing volume as point on the object if the sensing volume is determined to comprise the object or part thereof; and
   calculate, for a sensing volume, a weighted average of the initial coordinates assigned to the sensing volume and of all surrounding sensing volumes, the weighted average weighted by the signal intensities determined by a sensor for each of the sensing volumes contributing to the weighted average.

2. A device according to claim 1, wherein the processor is further configured to determine whether or not an object is within a said sensing volume by comparing the output signal for the sensing volume with a predetermined threshold value.

3. A device according to claim 1, wherein the processor is further configured to approximate the position, size or shape of the object by treating coordinates of the coordinates that are treated as point on the object and that are not wholly surrounded by sensing volumes that have also yielded a coordinate that is treated as a point on the object as a point along an edge of the object.

4. A device according to claim 1, wherein the sensing volumes are individually illuminated by one or more light sources.

5. A device according to claim 4, wherein the one or more light sources are configured to emit light so that light emitted to the first sensing volume has a different characteristic from light emitted to the second sensing volume.

6. A device according to claim 1, wherein the sensing volumes are individually sensed by one or more sensors.

7. A device according to claim 1, wherein directions of propagation of light illuminating different sensing volumes are non-parallel and/or wherein directions of propagation of light received at one or more sensors from different sensing volumes are non-parallel.

8. A device according to claim 7, wherein a plurality of sensors and/or emitters are arranged on non-parallel planes or on a curved surface and/or wherein the device is moveable and comprises means for moving the device around a perimeter of a volume in space and/or wherein light generated by a light source is consecutively directed to different sensing volumes and/or wherein a sensing volume of a sensor is consecutively directed to different sensing volumes.

9. A device according to claim 1, further storing code in a memory, the code, when executed by a processor of the device:
 defines virtual zones, planes and/or boundaries within the sensing volume of the device; and
 provides an output indicative of or reactive to a sensed presence of an object within a said zone or plane or on a predetermined side of a said boundary.

10. A device according to claim 1, the device comprising a memory storing information representing measurable characteristics of a predetermined shape and a memory storing code that, when executed by a processor of the device, causes the processor to:
 determine a parameter of any object present within the sensing volume of the device, wherein the parameter is suitable for comparison with said stored information;
 compare the parameter with the stored information; and
 if a correspondence is found during said comparing, provide an output indicating that the sensed object has been identified as having a parameter corresponding to said stored information.

11. A device according to claim 1, further comprising an input/output interface for communicatively connecting the device with an external or with an integrated host, the device storing code that, when executed by a processor of the device:
 performs an initial sensing operation and sends a sensing result of the initial sensing operation towards the host via the input/output interface;
 is configured to perform a further sensing operation to identify a parameter of a sensed object, wherein the parameter to be sensed in the sensing operation is at least partially selected based on information received from the host at the input/output interface after the sensing results had been sent to the host.

12. An input device for connecting to a host computer comprising a device for detecting an object, the device comprising two or more at least partially overlapping sensing volumes and configured to:
 illuminate the sensing volumes; and
 generate a sensing signal, individually for each sensing volume by sensing light modulated by any object in the sensing volume;
 wherein spatial encoding is applied to the sensing volumes;
 the device comprising a processor configured to:
  determine the presence of an object in said sensing volumes based on the sensing signals generated for the sensing volumes and on said spatial encoding;
  approximate position, size or shape of the object by treating a predetermined coordinate within each of the sensing volumes within which the presence of the object has been determined as a point on the object;
  use, for sensing volumes, an initial coordinate assigned to the sensing volume as point on the object if the sensing volume is determined to comprise the object or part thereof; and
 calculate, for a sensing volume, a weighted average of the initial coordinates assigned to the sensing volume and of all surrounding sensing volumes, the weighted average weighted by the signal intensities determined by a sensor for each of the sensing volumes contributing to the weighted average.

13. Device according to claim 1, wherein a light emitter for illuminating the sensing volume, the emitter creating a light intensity that continuously varies with increasing distance from a local maximum or minimum.

14. Device according to claim 1, wherein a sensor for generating a sensing signal for a sensing volume has a sensitivity to light that continuously varies within the sensing volume, starting from a local maximum or minimum.

15. A method of detecting an object, using a device comprising two or more at least partially overlapping sensing volumes, the method comprising:
 using the device to:
  illuminate the sensing volumes; and
  generate a sensing signal individually for each sensing volume by sensing light modulated by any object in the sensing volume;
 wherein spatial encoding is applied to the sensing volumes;
 the device comprising a processor configured to:
  determine the presence of an object in said sensing volumes based on the sensing signals generated for the sensing volumes and on said spatial encoding;
  approximate position, size or shape of the object by treating a predetermined coordinate within each of the sensing volumes within which the presence of the object has been determined as a point on the object;
  use, for sensing volumes, an initial coordinate assigned to the sensing volume as point on the object if the sensing volume is determined to comprise the object or part thereof; and
 calculate, for a sensing volume, a weighted average of the initial coordinates assigned to the sensing volume and of all surrounding sensing volumes, the weighted average weighted by the signal intensities determined by a sensor for each of the sensing volumes contributing to the weighted average.

16. A device for detecting an object, the device comprising two or more at least partially overlapping sensing volumes and configured to:
   illuminate the sensing volumes; and
   generate a sensing signal, individually for each sensing volume by sensing light modulated by any object in the sensing volume;
   wherein spatial encoding is applied to the sensing volumes;
   the device comprising a processor configured to:
      determine the presence of an object in said sensing volumes based on the sensing signals generated for the sensing volumes and on said spatial encoding;
      approximate position, size or shape of the object by treating a predetermined coordinate within each of the sensing volumes within which the presence of the object has been determined as a point on the object;
      use, for sensing volumes, an initial coordinate assigned to the sensing volume as point on the object if the sensing volume is determined to comprise the object or part thereof;
      calculate, for a sensing volume comprising an edge point deemed to fall along an edge of the object a weighted average of the initial coordinates assigned to a linearly aligned group of neighbouring sensing volumes comprising the sensing volume that comprises the edge point; and
      treat the calculated weighted coordinate average as the coordinates of a point on an edge of the object.

17. A method of detecting an object, using a device comprising two or more at least partially overlapping sensing volumes, the method comprising:
   using the device to:
      illuminate the sensing volumes; and
      generate a sensing signal individually for each sensing volume by sensing light modulated by any object in the sensing volume;
   wherein spatial encoding is applied to the sensing volumes;
   the device comprising a processor configured to:
      determine the presence of an object in said sensing volumes based on the sensing signals generated for the sensing volumes and on said spatial encoding;
      approximate position, size or shape of the object by treating a predetermined coordinate within each of the sensing volumes within which the presence of the object has been determined as a point on the object;
      use, for sensing volumes, an initial coordinate assigned to the sensing volume as point on the object if the sensing volume is determined to comprise the object or part thereof;
      calculate, for a sensing volume comprising an edge point deemed to fall along an edge of the object a weighted average of the initial coordinates assigned to a linearly aligned group of neighbouring sensing volumes comprising the sensing volume that comprises the edge point; and
      treat the calculated weighted coordinate average as the coordinates of a point on an edge of the object.

* * * * *